US009333521B2

(12) United States Patent
Holler et al.

(10) Patent No.: US 9,333,521 B2
(45) Date of Patent: May 10, 2016

(54) FILTER INSTALLATION AND METHOD FOR OPERATING A FILTER INSTALLATION

(71) Applicant: Dürr Systems GmbH, Bietigheim-Bissingen (DE)

(72) Inventors: Sebastian Holler, Korntal-Muenchingen (DE); Cord Kirschke, Hemmingen (DE); Dietmar Wieland, Waiblingen (DE); Andreas Ullmer, Heilbronn (DE)

(73) Assignee: Dürr Systems GmbH, Bietigheim-Bissingen (DE)

(*) Notice: Subject to any disclaimer, the term of this patent is extended or adjusted under 35 U.S.C. 154(b) by 49 days.

(21) Appl. No.: 14/157,026

(22) Filed: Jan. 16, 2014

(65) Prior Publication Data

US 2014/0130674 A1    May 15, 2014

Related U.S. Application Data

(63) Continuation of application No. PCT/EP2012/058167, filed on May 3, 2012.

(30) Foreign Application Priority Data

Jul. 27, 2011 (DE) .......................... 10 2011 079 951
Jul. 29, 2011 (DE) .......................... 10 2011 052 298
Nov. 2, 2011 (DE) ...................... 20 2011 107 555 U

(51) Int. Cl.
*B05B 15/12* (2006.01)
*B01D 46/00* (2006.01)

(52) U.S. Cl.
CPC ........ *B05B 15/1248* (2013.01); *B01D 46/0057* (2013.01); *B05B 15/1255* (2013.01); *B01D 2273/12* (2013.01); *Y02P 70/36* (2015.11)

(58) Field of Classification Search
CPC ............... B01D 46/00; B01D 46/0002; B01D 46/0041; B01D 2273/12; B05B 15/12; B05B 15/1225; B05B 15/1248; B05B 15/1255

USPC ........ 55/385, 2, 422, 482, 524, DIG. 46, 308, 55/318, 339; 95/267, 280, 285, 287, 23, 95/108; 96/372, 373, 150, 156, 157, 174, 96/134; 118/309, 326, 610, 712, 300; 427/300, 8, 401, 426; 423/210; 454/10, 454/50, 53, 54, 55

See application file for complete search history.

(56) References Cited

U.S. PATENT DOCUMENTS 2,394,710 A    2/1946   McAfee
2,571,380 A    10/1951  Penick
(Continued)

FOREIGN PATENT DOCUMENTS

CA    2 379 219    1/2001
CA    2 697 447    3/2009
(Continued)

*Primary Examiner* — Duane Smith
*Assistant Examiner* — Minh-Chau Pham
(74) *Attorney, Agent, or Firm* — Womble Carlyle Sandridge & Rice LLP

(57) ABSTRACT

In order to provide a filter installation, including a filter device for cleaning a raw gas flow loaded with paint overspray, the filter device including a filter element, on which paint overspray from the raw gas flow loaded with paint overspray is configured to be deposited together with the auxiliary filter material fed to the raw gas flow, a receiving container for receiving a system of paint overspray and auxiliary filter material and a removal device for removing at least a part of the system of paint overspray and auxiliary filter material from the receiving container, by means of which filter installation a material-saving, efficient filtering operation is configured to be carried out, it is proposed that the filter installation includes a processing device for processing the system of paint overspray and auxiliary filter material.

17 Claims, 11 Drawing Sheets

(56) References Cited

U.S. PATENT DOCUMENTS

| | | | |
|---|---|---|---|
| 2,650,155 A | 8/1953 | Medlin | |
| 4,017,422 A | 4/1977 | Gappa et al. | |
| 4,537,120 A | 8/1985 | Josefsson | |
| 5,078,084 A | 1/1992 | Shutic et al. | |
| 5,165,969 A * | 11/1992 | Barlett et al. | 427/483 |
| 5,766,355 A | 6/1998 | Josefsson et al. | |
| 6,162,270 A | 12/2000 | Nystrom et al. | |
| 6,226,568 B1 | 5/2001 | Tong et al. | |
| 8,377,177 B2 * | 2/2013 | Holzheimer et al. | 95/285 |
| 8,535,420 B2 * | 9/2013 | Holler et al. | 95/273 |
| 8,961,642 B2 | 2/2015 | Holler et al. | |
| 2008/0229925 A1 | 9/2008 | Wieland et al. | |
| 2010/0197213 A1 | 8/2010 | Holzheimer et al. | |
| 2010/0199912 A1 | 8/2010 | Holzheimer et al. | |
| 2011/0041691 A1 | 2/2011 | Weschke | |
| 2011/0059258 A1 | 3/2011 | Fritz et al. | |
| 2011/0274827 A1 | 11/2011 | Fritz et al. | |
| 2012/0285323 A1 | 11/2012 | Holler et al. | |
| 2013/0032089 A1 | 2/2013 | Link et al. | |
| 2014/0130674 A1 | 5/2014 | Holler et al. | |
| 2014/0134339 A1 | 5/2014 | Holler et al. | |
| 2014/0230725 A1 | 8/2014 | Holler et al. | |
| 2015/0283492 A1 | 10/2015 | Holler et al. | |

FOREIGN PATENT DOCUMENTS

| | | | | |
|---|---|---|---|---|
| CA | 2 842 258 | | 1/2013 | |
| DE | 38 23 924 | | 12/1989 | |
| DE | 42 11 465 | | 3/1996 | |
| DE | 100 02 584 | | 8/2001 | |
| DE | 20 2005 013 403 | | 12/2005 | |
| DE | 10 2005 013 708 | | 9/2006 | |
| DE | WO 2007/039275 A1 * | 4/2007 | | 55/DIG. 46 |
| DE | 10 2007 041 008 | | 3/2009 | |
| DE | 10 2008 013 713 | | 9/2009 | |
| DE | 20 2010 012 437 | | 12/2010 | |
| DE | 10 2009 048 005 | | 4/2011 | |
| DE | 10 2009 058 206 | | 6/2011 | |
| EP | 0 356 658 | | 3/1990 | |
| EP | 0 756 885 | | 2/1997 | |
| EP | 1 704 925 | | 9/2006 | |
| EP | 2 039 436 | | 3/2009 | |
| GB | 2 024 041 | | 1/1980 | |
| JP | 05-084420 | | 4/1993 | |
| JP | 06-047245 | | 2/1994 | |
| WO | WO 03/092907 | | 11/2003 | |
| WO | WO 2010/069407 | | 6/2010 | |
| WO | WO 2011/076600 | | 6/2011 | |

* cited by examiner

FILTER INSTALLATION AND METHOD FOR OPERATING A FILTER INSTALLATION

CROSS-REFERENCE TO RELATED APPLICATIONS

The present application is a continuation of international application PCT/EP2012/058167, filed on May 3, 2012, and this application claims the benefit of German patent application numbers 10 2011 079 951.6, filed Jul. 27, 2011; 10 2011 052 298.0, filed Jul. 29, 2011; and 20 2011 107 555.2, filed Nov. 2, 2011; the entire specification of all being incorporated herein by reference.

FIELD OF DISCLOSURE

The present invention relates to a filter installation, which comprises a filter device for cleaning a raw gas flow loaded with paint overspray, the filter device comprising a filter element, on which paint overspray from the raw gas flow loaded with paint overspray together with the auxiliary filter material fed to the raw gas flow is configured to be deposited. Furthermore, the filter device comprises a receiving container for receiving a system of paint overspray and auxiliary filter material and a removal device for removing at least a part of the system of paint overspray and auxiliary filter material from the receiving container.

BACKGROUND

Basically, it may be provided in a filter installation of this type that the system of paint overspray and auxiliary filter material, after a certain operating period of the filter device, is removed from the receiving container and disposed of and that fresh auxiliary filter material not loaded with paint overspray is fed to this filter device for the further operation of the filter installation.

SUMMARY OF THE INVENTION

The present invention is based on the object of providing a filter installation of the type mentioned at the outset, by means of which a material-saving, efficient filtering operation is configured to be carried out.

This object is achieved according to the invention in that the filter installation comprises a processing device for processing the system of paint overspray and auxiliary filter material.

A system of paint overspray and auxiliary filter material can, for example, be a mixture of paint overspray particles and auxiliary filter material particles. In particular, a system of paint overspray and auxiliary filter material is formed by conglomerates and/or agglomerates of paint overspray particles, in particular paint droplets, and auxiliary filter material particles, in particular rock flour grains.

A system of paint overspray and auxiliary filter material may, for example, substantially exclusively consist of agglomerates and/or conglomerates of paint overspray particles and auxiliary filter material particles.

Furthermore, a system of paint overspray and auxiliary filter material may be formed by processed auxiliary filter material, in particular a processed system of paint overspray and auxiliary filter material.

Furthermore, a system of paint overspray and auxiliary filter material may be a mixture of fresh (unused), auxiliary filter material not loaded with paint overspray, of agglomerates and/or conglomerates of paint overspray particles and auxiliary filter material particles and/or of processed auxiliary filter material.

Since the filter installation according to the invention comprises a processing device for processing the system of paint overspray and auxiliary filter material, a complete disposal of the system of paint overspray and auxiliary filter material after a one-off use of the auxiliary filter material in a filter device is preferably dispensable. Rather, the system of paint overspray and auxiliary filter material can preferably be fed again as a processed auxiliary filter material to a filter device. As a result, it is possible to operate the filter installation in a material-saving and efficient manner.

The system of paint overspray and auxiliary filter material collects, in particular after a cleaning process of the filter element, in the receiving container, preferably arranged under the filter element, for auxiliary filter material and/or for a system of paint overspray and auxiliary filter material (also called an "auxiliary filter material receiving container"), The filter installation preferably comprises one or more filter devices and/or one or more processing devices.

The filter device preferably comprises one or more filter elements, one or more receiving containers and/or one or more removal devices.

Any medium, which is in a position to absorb a liquid proportion of the paint overspray, can be used, in particular, as the auxiliary filter material.

In particular, lime, rock flour, in particular limestone powder, aluminum silicates, aluminum oxides, silicon oxides, powder paint or the like can be considered, for example, as auxiliary filter materials.

As an alternative or in addition to this, particles with a cavity structure and large inner surface relative to their outer dimensions may also be used as the auxiliary filter material to absorb and/or bind the paint overspray, for example natural and/or synthetic zeolites or other hollow, for example spherical, bodies made of polymers, glass or aluminum silicate and/or natural or synthetically produced fibers.

There are designated as zeolites, in particular aluminosilicates, which have the general total formula $M^{n+}_{x/n}[(AlO_2)^{x-}(SiO_2)^{y}] \cdot z\, H_2O$ ($M^{n+}$: metal cation; x/n: stoichiometric factor, which arises from the charge of the cation and that of the aluminate anion (="modulus)). For example, calcium, magnesium, calcium-magnesium, sodium and/or potassium zeolites may be used. Mixtures of two or more of these zeolite types are preferably used.

As an alternative or in addition to this, particles reacting chemically with the overspray may also be used as the auxiliary filter material to absorb and/or bind the paint overspray, for example chemically reactive particles with amine, epoxide, carboxyl, hydroxyl or isocyanate groups, chemically reactive particles made of aluminum oxide post-treated with octyl silane or solid or liquid monomers, oligomers or polymers, silanes, silanols or siloxanes.

The auxiliary filter material preferably consists of a large number of auxiliary filter material particles, which, in particular, have a mean diameter in the range of about 10 μm to about 100 μm.

The auxiliary filter material is, in particular, a flowable, particulate material, which is also called a "precoat" material.

The auxiliary filter material is used, in particular, to be deposited on the surface of the filter element as a barrier layer, in order to prevent this surface clogging due to adhering paint overspray particles. By cleaning the filter element periodically, the system of auxiliary filter material and paint overspray arrives from the filter element into the receiving container.

In one configuration of the invention it is provided that the processing device comprises a thermal treatment device, by means of which the system of paint overspray and auxiliary filter material is thermally treatable to process the system.

A thermal treatment device may, in particular, be a heating device, by means of which the system of paint overspray and auxiliary filter material can be heated. In particular, a liquid proportion in the system of paint overspray and auxiliary filter material is configured to be evaporated by means of a heating device.

A thermal treatment device may furthermore, be configured as a combustion device. By means of a combustion device, in particular readily volatile, in particular organic, constituents of the system of paint overspray and auxiliary filter material, for example solvents, can be combusted and therefore removed from the system of paint overspray and auxiliary filter material. In particular, an oxidative combustion of the system of paint overspray and auxiliary filter material can take place.

It may furthermore be advantageous if a thermal treatment device comprises a pyrolysing device, by means of which the system of paint overspray and auxiliary filter material is configured to be pyrolysed.

It may be favorable if the processing device comprises a plurality of thermal treatment devices, which preferably have different functions. In particular, it may be provided that liquid constituents of the system of paint overspray and auxiliary filter material are evaporated by means of a thermal treatment device configured as a heating device. A combustion of the flammable constituents of the liquid proportion can then take place, for example, by means of a thermal treatment device configured as a combustion device and/or as a post-combustion device. In particular, solvents which are released from the system of paint overspray and auxiliary filter material can thus be combusted and therefore made unharmful.

It may be advantageous if a thermal treatment device is configured as a cooling device. In particular, the system of paint overspray and auxiliary filter material can be cooled down by means of a cooling device of this type to below a glass transition temperature, so that the paint overspray preferably becomes brittle.

A thermal treatment device may furthermore be configured as a drying device, by means of which for example dry air, which is not saturated and can absorb moisture, is feedable to the system of paint overspray and auxiliary filter material to dry the system. The air is preferably hot air, which, for example, has a temperature of at least about 40° C., in particular at least about 60° C.

In particular, air, which comes from a workpiece drying device to dry painted workpieces, can be used for this.

A rotary furnace, a tumble dryer, a screw dryer, a fluidized bed dryer and/or a flow dryer, in particular, may be used as the combustion device, as the post-combustion device and/or as the heating device.

The feeding of the system of paint overspray and auxiliary filter material into the combustion device, the post-combustion device and/or the heating device may, for example, take place by means of a screw conveyor and/or by means of a vibrating channel.

For example when using fluidized bed dryers and flow dryers, a dispensing of the system of paint overspray and auxiliary filter material can take place by means of pneumatic conveying, for example by means of dilute phase conveying, dense phase conveying and/or plug conveying.

The combustion device, the post-combustion device and/or the heating device are preferably operated electrically and/or by gas.

In one configuration of the invention it is provided that the processing device comprises one or more mechanical treatment devices, with which the system of paint overspray and auxiliary filter material is mechanically treatable to process the system, in particular, it may be provided that agglomerates of paint overspray and auxiliary filter material are broken up by this.

In particular, it may be provided that a mechanical treatment device is configured as a grinding device, by means of which the system of paint overspray and auxiliary filter material can be ground.

The mechanical treatment device is furthermore preferably a comminuting device for comminuting agglomerates of paint overspray and auxiliary filter material.

It may be advantageous if the processing device comprises a pneumatic treatment device, by means of which the system of paint overspray and auxiliary filter material can be loaded with air to process the system.

A pneumatic treatment device may be a compressed air device, by means of which the system of paint overspray and auxiliary filter material can be loaded with compressed air to process the system.

Furthermore, a pneumatic treatment device may be a swirling device, by means of which the system of paint overspray and auxiliary filter material can be swirled. In particular, it can be achieved by means of a swirling device of this type in conjunction with baffle plates that the swirled agglomerates of paint overspray and auxiliary filter material impact against one another and against the impact plates and are thus comminuted.

Furthermore, the system of paint overspray and auxiliary filter material is preferably dryable by means of a pneumatic treatment device. In particular, a drying may take place and/or be accelerated in that the system of paint overspray and auxiliary filter material is swirled.

A mechanical and/or chemical processing of the system of paint overspray and auxiliary filter material is preferably configured to be carried out by means of the processing device.

The filter installation preferably comprises a storage device for receiving and storing auxiliary filter material and/or a system of paint overspray and auxiliary filter material.

The storage device may, for example, be configured as a silo, in particular as a warehouse silo, as a storage silo and/or as a blending silo.

A receiving and storage of auxiliary filter material and/or a system of paint overspray and auxiliary filter material can take place by means of a storage device, in particular outside the receiving container.

In one configuration of the invention it is provided that a storage device is an intermediate storage device for the intermediate storage of a processed system of paint overspray and auxiliary filter material. The processed system of paint overspray and auxiliary filter material is preferably feedable from the processing device to the intermediate storage device. It may furthermore be provided that the processed system of paint overspray and auxiliary filter material is providable for at least one filter device by means of the intermediate storage device. An advantage of the intermediate storage device is that the irregular emptying of the individual receiving containers can thus be buffered and therefore a continuous feeding, for example of a rotary furnace with auxiliary material, is possible.

It may be advantageous if a storage device is an intermediate storage device for the intermediate storage of a system of paint overspray and auxiliary filter material removed from the receiving container and to be fed to the processing device. It may be provided here, that the system of paint overspray and auxiliary filter material is feedable from the receiving container to the intermediate storage device. Furthermore, it may be provided that the system of paint overspray and auxiliary filter material is configured to be provided for the processing device by means of the intermediate storage device.

The system of paint overspray and auxiliary filter material, which is to be fed to the processing device, is also called the system of paint overspray and auxiliary filter material to be processed.

In one configuration of the invention it is provided that the filter installation comprises a control device and/or a regulating device, by means of which it is determinable whether the auxiliary filter material provided to the filter device for cleaning the raw gas flow is unloaded, fresh auxiliary material or a system of paint overspray and auxiliary filter material.

In particular, a number of processing operations can be detected by means of a control device and/or a regulating device, so that an (excess) enrichment of paint overspray in the auxiliary filter material is determinable and preferably avoidable.

Auxiliary filter material loaded with paint overspray is, in particular, the system of paint overspray and auxiliary filter material cleaned off at least one filter element.

It may be advantageous if the filter installation comprises a mixing device, by means of which unloaded, fresh auxiliary filter material and a system of paint overspray and auxiliary filter material are combinable and mixable.

In particular, it may be provided that the filter installation comprises a mixing device, by means of which unloaded, fresh auxiliary filter material and a processed system of paint overspray and auxiliary filter material are combinable and mixable.

Alternatively or in addition to this, it may be provided that the filter installation comprises at least one mixing device, by means of which unloaded, fresh auxiliary material and a non-processed system of paint overspray and auxiliary filter material are combinable and mixable.

Furthermore, it may be provided that the filter installation, in particular at least one filter device, comprises at least one mixing device (mixing mechanism), by means of which a system of paint overspray and auxiliary filter material is mixable, so that a substantially homogeneous system is obtainable, in which auxiliary filter material particles loaded with paint overspray and unloaded auxiliary filter material particles are arranged substantially uniformly distributed.

The filter installation preferably comprises a measuring device for measuring the degree of loading, in other words the proportion of paint overspray in the system of paint overspray and auxiliary filter material, for example in relation to the total volume and/or the total mass of the system of paint overspray and auxiliary filter material.

A mixing ratio for mixing the unloaded, fresh auxiliary filter material with the system of paint overspray and auxiliary filter material, in particular depending on the degree of loading of the auxiliary filter material with paint overspray, is preferably configured to be controlled and/or regulated by means of a control device and/or a regulating device.

The filter installation according to the invention is suitable, in particular, for use in a painting installation for painting workpieces, in particular vehicle bodies.

A painting installation preferably comprises at least one filter device for separating paint overspray from a raw gas flow containing overspray particles (paint overspray), the at least one filter device comprising in particular the following:

a housing, which delimits a raw gas chamber of the filter device and in which at least one filter element of the filter device is arranged;

at least one inlet channel for letting the raw gas flow into the raw gas chamber of the filter device; and/or an (auxiliary filter material) introduction mechanism for introducing auxiliary filter material or a system (mixture) of paint overspray and auxiliary filter material into the raw gas flow.

The painting installation preferably does not have a device for wet separation of paint overspray.

The (auxiliary filter material) introduction mechanism preferably comprises at least one processing mechanism (processing device), in particular at least one treatment device, and/or at least one receiving container.

The painting installation preferably furthermore comprises:

a painting booth, in which workpieces are paintable with paint;

a (workpiece) conveying device, by means of which the workpieces to be painted are configured to be conveyed in a (workpiece) conveying direction through the painting booth;

a separating and/or filter installation (called a "filter installation" for simplification) for cleaning a raw gas flow, which is leaving the painting booth and which has absorbed paint overspray in the painting booth, the filter installation comprising at least one filter device for separating the paint overspray from the raw gas flow; and/or at least one clean gas line for a clean gas flow, which is obtainable by cleaning the raw gas flow by means of the at least one filter device.

At least one filter device is preferably configured as a regenerable filter device.

A regenerable filter device is to be taken to mean a separating device for separating impurities from a gas flow guided through the painting booth, in particular for separating paint overspray from a gas flow containing overspray particles, in which deposited impurities can be cleaned off, without having to exchange filter elements of the filter device.

Provided as a regenerable filter device (filter arrangement) is, in particular, also a filter device, which has one or more dry filter elements and/or one or more dry separating devices, in which a cleaning of a gas flow takes place substantially without the addition of a liquid on the filter elements. Independently of this, following or prior cleaning stages can in turn be provided using (in normal conditions) liquid solvents or cooling agents.

Regardless of the cleaning function of a dry filter element and/or a dry separating device, which takes place without the addition of a liquid, it may be provided that a liquid, in particular a cleaning liquid, is applied to at least one dry filter element and/or at least one dry separating device for cleaning the same, in particular for removing a filter cake of paint overspray and auxiliary filter material. A cleaning of at least one dry filter element and/or at least one dry separating device can thus take place wet, while a separating operation/filter operation preferably takes place dry.

It may be provided in a regenerable filter device that the filter device comprises at least one filter element, which is provided during filter operation with a barrier layer and/or a protective layer, which comprises auxiliary filter material, in particular, rock flour, preferably limestone powder, and/or natural and/or synthetic zeolites.

The filter element can thus be prevented from clogging with impurities from the gas flow fed to the filter device during filter operation of the filter device. By cleaning the barrier layer or protective layer from the filter element of the filter device, a particularly simple regeneration of the filter element can take place, which can then be reused for applying a fresh barrier layer or a fresh protective layer.

Powder paint or fluid paint, in particular, can be configured as the paint.

A paint with a flowable consistency, from fluid through to pasty (for example in the case of a PVC plastisol) is designated by the term "fluid paint" here—in contrast to the term "powder paint". The term "fluid paint" in particular comprises the terms "liquid paint" and "wet paint".

When using fluid paint, the paint overspray from the painting booth is therefore a fluid paint overspray and when using wet paint, it is a wet paint overspray.

The filter installation can, furthermore, comprise at least one air classifier, for example a cascade system and/or a ZZ classifier (zigzag sifter), for separating the fine constituents of the system of paint overspray and auxiliary filter material from the coarser constituents of the system of paint overspray and auxiliary filter material. In particular, auxiliary filter material particles, which are not loaded with paint overspray (smaller particles) can be separated by means of a air classifier of this type from agglomerates of paint overspray and auxiliary filter material (larger particles).

An air classifier is preferably used to separate the coarse proportions from the fine proportions in the, in particular at least partly processed, system of paint overspray and auxiliary filter material.

It may furthermore be provided that a air classifier is configured as a hood sifter, by means of which unloaded auxiliary filter material particles are separable from agglomerates of paint overspray and auxiliary filter material.

The present invention furthermore relates to a method for operating a filter installation, in particular a filter installation according to the invention, comprising the following:
  feeding a raw gas flow loaded with paint overspray to a filter device of a filter installation;
  introducing auxiliary filter material into the raw gas flow;
  separating a system of paint overspray and auxiliary filter material and receiving the system in a receiving container.

The present invention is based in this regard on the object of providing a method for operating a filter installation, which is configured to be carried out efficiently with a low material outlay.

This object is achieved according to the invention in that at least a part of the system of paint overspray and auxiliary filter material is processed by means of a processing device.

The method according to the invention preferably has the features and/or advantages described above in conjunction with the filter installation according to the invention.

It is provided in one configuration according to the invention that the system of paint overspray and auxiliary filter material is thermally treated to process the system.

In particular, it may be provided that the system of paint overspray and auxiliary filter material, to process the system, is dried, burned, combusted and/or cooled and/or subjected to a pyrolysis method.

The system of paint overspray and auxiliary filter material is, for example, heated by direct contact with a, for example, electrical, heating device and/or by a burner flame and/or by hot burner exhaust gases. The system of paint overspray and auxiliary filter material is preferably indirectly heated, a partitioning and/or a heat exchanger, in particular, being provided between the system, on the one hand, and the heating device, a heating medium, a burner flame and/or hot burner exhaust gases, on the other hand.

It may be favorable if the system of paint overspray and auxiliary filter material has compressed air applied thereto to process the system. On the one hand, a drying of the system of paint overspray and auxiliary filter material can thus be achieved. Furthermore, the system of paint overspray and auxiliary filter material can thus be swirled. In particular, when the system of paint overspray and auxiliary filter material is accelerated by means of a compressed air device toward impact plates, a swirling and, simultaneously, a comminution of agglomerates can be achieved.

It may be favorable if a receiving container with at least one pneumatic treatment device is provided. In particular, it may be provided that the pneumatic treatment device comprises at least one air nozzle, for example a Laval nozzle, by means of which air at excess pressure (above the normal pressure of 1013 mbar), for example between about 0.1 bar and about 7 bar excess pressure, preferably at about 2 bar excess pressure, can be introduced into the system of paint overspray and auxiliary filter material.

The system of paint overspray and auxiliary filter material is preferably swirled by means of the compressed air and comminuted because of impacts of the agglomerates with one another and/or with walls of the receiving container and/or with baffle plates.

The pneumatic treatment device may comprise an air compressor. As an alternative or in addition to this, the pneumatic treatment device may be operated with compressed air.

The air for the pneumatic treatment device is, in particular, fresh air, which is branched from a fresh air feed device of a painting installation, in particular from a feed for fresh air for a painting process of the painting installation and/or, in particular, filtered, circulating air or workshop air, which is preferably compressed.

Alternatively or in addition to this, it may be provided that, in particular cleaned, exhaust air from the painting installation is used for the pneumatic treatment device.

A pneumatic treatment device may furthermore comprise a fluidized bed, which, for example, is arranged in the receiving container. A fluidized bed preferably comprises one or more nozzles, by means of which the auxiliary filter material particles or agglomerates of paint overspray and auxiliary filter material are configured to be accelerated against one another and/or against impact plates, in order to bring about a breaking up of the agglomerates of paint overspray and auxiliary filter material.

At least one nozzle of at least one pneumatic treatment device is preferably arranged in such a way that an air jet produced by means of the nozzle is directed substantially horizontally into the system of paint overspray and auxiliary filter material. Alternatively or in addition to this, it may be provided that at least one nozzle of at least one pneumatic treatment device is arranged in such a way that at least one air jet is directed vertically or at an (oblique) angle onto the system of paint overspray and auxiliary filter material. In particular, it may be provided that an air jet flows through the system of paint overspray and auxiliary filter material vertically from bottom to top, vertically from top to bottom or diagonally.

It may be advantageous if at least one flow chicane, by means of which the system of paint overspray and auxiliary filter material, to extend a pneumatic comminuting process (grinding process), can be held in the receiving container, before it is fed to the raw gas flow and finally to the filter elements.

It may furthermore be provided that at least one pneumatic treatment device comprises at least one nozzle, which is arranged in such a way that an air jet is directed perpendicularly or at an (oblique) angle, to a part of a mixing mechanism and/or (another) mechanical treatment device, so that the mixing mechanism and/or the mechanical treatment device form one or more impact plates for agglomerates of paint overspray and auxiliary filter material.

In particular, the mixing device and/or the (other) mechanical treatment device is configured in such a way that the system of paint overspray and auxiliary filter material is conveyed in the direction of at least one nozzle of at least one pneumatic treatment device in order to be able to introduce the system of paint overspray and auxiliary filter material into an air flow produced by the at least one nozzle.

The process of breaking up the agglomerates of paint overspray and auxiliary filter material, for example a mechanical or pneumatic grinding process, can preferably take place continuously or in a pulsed manner.

In one configuration of the invention it is provided that at least one auxiliary processing substance is supplied to the system of paint overspray and auxiliary filter material to process the system.

In particular, at least one drying agent, for example silica gel or zeolite, and/or at least one anti-caking substance, for example sand or limestone powder, can be fed to the system of paint overspray and auxiliary filter material to process the system. In particular when using limestone powder as the anti-caking substance, it may be provided that an average grain size of the limestone powder used as the anti-caking substance is selected to be greater than an average grain size of the auxiliary filter material, which is, for example, also formed from limestone powder.

It may be advantageous if at least two method steps, in particular at least two method steps that are different from one another, are carried out to process the system of paint overspray and auxiliary filter material.

It may be favorable if at least two method steps are carried out successively in time to process the system of paint overspray and auxiliary filter material.

As an alternative or in addition to this, it may be provided that at least two method steps are carried out substantially simultaneously and/or overlapping in time to process the system of paint overspray and auxiliary filter material.

At least a part of the system of paint overspray and auxiliary filter material is preferably removed from the receiving container and processed outside the receiving container.

In particular, the removed and processed part of the system of paint overspray and auxiliary filter material is again fed as auxiliary filter material to the filter device, in particular introduced again into the raw gas flow.

Alternatively or in addition to this, it may be provided that at least one part of the system of paint overspray and auxiliary filter material is processed in the receiving container. A removal and renewed feeding of the system of paint overspray and auxiliary filter material is then preferably dispensable or can at least be delayed.

Basically, it may be provided that at least one part of the system of paint overspray and auxiliary filter material, after removal from the receiving container, after processing by means of the processing device and/or before feeding to the at least one filter device, is stored, in particular intermediately stored, by means of a storage device, in particular by means of an intermediate storage device. A large quantity of auxiliary filter material, in particular processed auxiliary filter materials, is thus always available.

As an alternative or in addition to this, it may be provided that at least a part of the system of paint overspray and auxiliary filter material is removed from the receiving container, processed and fed to the receiving container again, while no filter operation is carried out in the filter device, for example during a cleaning operation of the filter device. An external storage of the system of paint overspray and auxiliary filter material is then preferably dispensable.

An exchange of the system of paint overspray and auxiliary filter material in the receiving container preferably takes place during normal operation of the filter installation.

In particular, an intermediate storage device can be dispensed with here if at least a part of the system of paint overspray and auxiliary filter material is removed from the storage container and fed to the processing device within a time of, for example, about two to about three minutes. Within this time, the processing is furthermore preferably carried out and the processed system of paint overspray and auxiliary filter material is immediately fed again to the same receiving container. Painting can continue in the painting installation, in this case, preferably without hindrance, it being possible for the short time without, or with only a small quantity of, auxiliary filter material to be retained by the process itself. In particular, within this short time span, a cleaning of the raw gas flow loaded with paint overspray can still take place at the filter elements, as these, despite a cleaning thereof, preferably still always have a thin layer of auxiliary filter material.

The method according to the invention for operating a filter installation is suitable, in particular, for carrying out in a method for operating a painting installation.

The method for operating a painting installation preferably comprises the following method steps:

- conveyance of workpieces in a (workpiece) conveying direction through the painting booth by means of a (workpiece) conveying device and painting the workpieces in the painting booth;
- feeding a raw gas flow from the painting booth of the painting installation, which has absorbed paint overspray in the painting booth, to a filter installation, in particular a filter installation according to the invention;
- separating paint overspray from the raw gas flow loaded with overspray particles by means of at least one filter device of the filter installation, so that a clean gas flow is obtained, wherein, by means of at least one (auxiliary filter material) introduction mechanism, in particular by means of a treatment device for the mechanical treatment of auxiliary filter material and/or a system of auxiliary filter material and overspray particles (paint overspray), auxiliary filter material and/or a system of paint overspray and auxiliary filter material is loosened.

The method for operating a painting installation preferably has the features and/or advantages described above in conjunction with the filter installation, the painting installation and/or the method for operating a filter installation.

Furthermore, the filter installation, the painting installation, the method for operating a filter installation and/or the method for operating a painting installation may have the following described features and/or advantages:

The system of paint overspray and auxiliary filter material is preferably not stored in a storage device (silo) for end use when emptying a filter device, but ground by means of a suitable processing device, in particular a grinding device (mill), to a mean grain size again, which at least approximately corresponds to the mean grain size of unloaded, fresh auxiliary filter material.

At least two storage devices (silos) are preferably provided, between which (with regard to a conveying direction of the system of paint overspray and auxiliary filter material) at least one processing device is arranged. A high requirement of auxiliary filter material during peak times can be buffered by means of at least one storage device. Furthermore, as a result, relatively long processing times, for example grinding times, can be compensated, so that a total time for the removal of at least a part of the system of paint overspray and auxiliary filter material from the receiving container until the renewed feeding of fresh or processed auxiliary filter material to the filter device is substantially constant, or at least a predetermined period is not exceeded.

The filter installation preferably comprises at least one (auxiliary filter material) conveying mechanism, by means of which auxiliary filter material and/or the system of paint overspray and auxiliary filter material is configured to be conveyed between the individual constituents of the filter installation. In particular, by means of the conveying device, auxiliary filter material and/or a system of paint overspray and auxiliary filter material is configured to be conveyed from at least one storage device to at least one filter device, from at least one filter device to the processing device and/or vice versa.

It is preferably monitorable by means of a control device and/or a regulating device whether fresh auxiliary filter material or auxiliary filter material, which has already been used and processed once or repeatedly has been fed to a filter device. Electronic flags, in particular, can be used for this purpose.

In particular, during repeated use of the system of paint overspray and auxiliary filter material, there is a danger of a proportion of organic constituents, in particular solvents, being concentrated in the system of paint overspray and auxiliary filter material. The system of paint overspray and auxiliary filter material can consequently become flammable or (dust) explosive. The number of processing operations and/or the return to the at least one filter device is preferably therefore monitored, so a predetermined limit concentration of dangerous substances is not exceeded.

The danger of an enrichment of flammable or explosive constituents in the system of paint overspray and auxiliary filter material may, in particular, be reduced in that a processing of the system of paint overspray and auxiliary filter material takes place by means of a thermal processing device.

Depending on a selected temperature range in the thermal processing, a different processing of the system of paint overspray and auxiliary filter material can take place. Thus, for example, solvents can be simply vaporized from the system at a temperature of at most about 100° C. This can, in particular, take place in a mechanical treatment device, for example in a grinding device, in that the entire grinding device is heated and/or in that heated air is fed to the grinding device. In particular, it may be provided that the heating of the grinding device takes place by means of friction in the grinding device during the processing of the system of paint overspray and auxiliary filter material, so that no additional heat supply is necessary in order to heat the system of paint overspray and auxiliary filter material to the temperature required to vaporize the solvents. To achieve the desired temperature, a corresponding grinding time can be adjusted. Furthermore, a degree of grinding can be adjusted by adjusting the grinding time, a relatively long grinding time leading to a relatively small grain size (up to the construction-related lower limit of the grinding tool).

A paint proportion in the system of paint overspray and auxiliary filter material can preferably harden in a temperature range between about 100° C. and about 180° C. The air preferably fed for this purpose may, in particular, come from other system parts of the filter installation or the painting installation. Thus, for example, exhaust air from a dryer (workpiece drying device) for painted workpieces may be used. The heating of the system of paint overspray and auxiliary filter material to the temperature required for hardening the paint proportion preferably takes place in an intermediate step before the mechanical treatment by means of the mechanical treatment device, in particular before the grinding by means of the grinding device.

In a temperature range above about 400° C., a thermal processing of the system of paint overspray and auxiliary filter material can take place in that an organic proportion in the system of paint overspray and auxiliary filter material is combusted. In particular a rotary furnace or the like can be provided for this, to which the system of paint overspray and auxiliary filter material is feedable.

Alternatively or in addition to this, it may be provided that the system of paint overspray and auxiliary filter material is cooled by means of a thermal treatment device configured as a cooling device. In particular, a cooling of the (previously heated) system of paint overspray and auxiliary filter material can take place by means of a cooling device of this type to the (optimal) temperature required for operation of the grinding device.

In one configuration of the invention it is provided that a mechanical treatment device is configured as a feed device for feeding the system of paint overspray and auxiliary filter material to a combustion device, so that a mechanical treatment, for example a grinding process, is configured to be carried out during the feeding of the system of paint overspray and auxiliary filter material to the combustion device.

It may be favorable if the air necessary to operate a rotary furnace is the exhaust air of a dryer (workpiece drying device) for drying painted workpieces, which is heated to reach the temperature required to operate the rotary furnace. The exhaust air from the rotary furnace is preferably fed together with the combustion products as a (part) air flow to a thermal post-combustion device of the painting installation.

The exhaust air of the rotary furnace during the paint loading of the auxiliary filter material, which is possible in the process is preferably not hotter than is required for the thermal post-combustion. However, on the one hand, the part air flow is hotter than the supply air flow into the thermal post-combustion, so that fuel can thus be saved. On the other hand, a fuel saving is achieved in that the rotary furnace—within certain limits—can be operated autothermally, so that owing to the combustion energy being released, subsequent heating does not have to be so powerful to heat the rotary furnace to temperature.

It may be advantageous to additionally cool, so the conversion of calcium carbonate ($CaCO_3$) contained in the auxiliary filter material into calcium oxide (CaO) is prevented.

As an alternative or in addition to this, it may be provided that a part air flow of the dryer exhaust air is used to heat the rotary furnace after running through the thermal post-combustion. The exhaust air of the rotary furnace is then preferably fed as a part air flow back to the thermal post-combustion.

A combustion device configured as a rotary furnace may, for example, be operated by the counter-flow principle. For this purpose, hot process air is preferably introduced into an interior of the rotary furnace on the side, on which thermally treated system of paint overspray and auxiliary filter material, in particular processed rock flour, is removed from the interior of the rotary furnace. The system to be processed of paint overspray and auxiliary filter material is accordingly introduced on a side of the rotary furnace opposite to this side into the interior of the rotary furnace. A rotary furnace of this type may provide the advantage that the system of paint overspray and auxiliary filter material, upon the introduction thereof into the interior of the rotary furnace, comes into direct contact with the hot process gas, in other words with the process gas heated in the rotary furnace. The rotary furnace can consequently preferably be made shorter.

Alternatively or in addition to this, it may be provided that a combustion device is configured as a rotary furnace, which is operated by a co-current flow principle. The process air and the system of paint overspray and auxiliary filter material are introduced from the same side here into the interior of the rotary furnace. The rotary furnace may have a longer length here. Condensates forming may be kept for longer in the hot process gas, so the probability is increased of these condensates also being combusted. The quantity of tar-like residues forming can preferably be reduced by this.

It may be advantageous if a rotary furnace comprises at least one heating zone, preferably two or more heating zones, in particular four heating zones. Different temperatures preferably prevail in different heating zones. It may thus, for example, be provided that a temperature is kept lower in a first heating zone than in at least one further heating zone following it, in order to first of all expel volatile constituents.

These volatile constituents are preferably easy to completely combust to form carbon dioxide.

It may be provided that the system of paint overspray and auxiliary filter material, in particular the processed system of paint overspray and auxiliary filter material, for example processed rock flour, is removed from the rotary furnace at the end thereof.

However, it may be advantageous if the system of paint overspray and auxiliary filter material, in particular the processed system of paint overspray and auxiliary filter material, for example the processed rock flour, is removed from the rotary furnace between two heating zones, in particular sluiced out. For this purpose, a removal device may be provided, for example.

The process gas preferably remains in the rotary furnace and can be as far as possible completely combusted in the further heating zones. A heating of pipelines to the final combustion of the evaporated and/or partly combusted organic substances can preferably be avoided by this.

By sluicing the system of paint overspray and auxiliary filter material from the rotary furnace, a separation between the process exhaust gases and the processed system of paint overspray and auxiliary filter material can be optimized.

It may be provided that at least one heating zone, which, with respect to a conveying direction of the system of paint overspray and auxiliary filter material, is arranged downstream of a removal device for sluicing out the processed system of paint overspray and auxiliary filter material, has a higher temperature than at least one heating zone arranged before the removal device. As a result, a higher temperature can be set in portions in the rotary furnace, without it having to be feared that the auxiliary filter material is itself chemically converted. For example, a temperature in the rotary furnace may be increased to about 700° C. in portions. An additional thermal post-combustion is then preferably dispensable.

The temperature in the rotary furnace is preferably selected such that the auxiliary filter material is not thermally impaired, but the organic constituents of the system of paint overspray and auxiliary filter material are preferably completely combusted. Depending on the auxiliary filter material used, for example calcium carbonate ($CaCO_3$), zeolites or aluminum oxide ($Al_2O_3$), a temperature in the interior of the rotary furnace is adapted to this accordingly.

A paint proportion in the system of paint overspray and auxiliary filter material is preferably brought by cooling to a temperature below a glass transition temperature of the paint overspray, so the paint proportion becomes brittle and is grindable more easily. The cooling of the system of paint overspray and auxiliary filter material may preferably take place for this purpose before the introduction of the system of paint overspray and auxiliary filter material into a mechanical treatment device, in particular into a grinding device. Alternatively or in addition to this, it may be provided that the system of paint overspray and auxiliary filter material is cooled down in the mechanical treatment device, in particular into a grinding device, to a temperature below the glass transition temperature of the paint.

It may be favorable if the system of paint overspray and auxiliary filter material is subjected to a pyrolysis method. Binder proportions in the system of paint overspray and auxiliary filter material can be removed and/or converted by this, so that the pure auxiliary filter material preferably remains, which is then preferably present in its original mean grain size.

In one configuration of the invention, it may be provided that a plurality of grinding steps is carried out consecutively. Thus, for example, it may be provided that a certain quantity of auxiliary filter material is firstly fed to the filter device, loaded there with paint overspray, then processed, in particular ground, then fed again to the filter device, loaded there with further paint overspray and finally ground again, etc. The auxiliary filter material is preferably used until it has a predetermined paint proportion (paint content) and/or energy content. In a subsequent step, a pyrolysis process is preferably carried out. The pyrolysis process may be carried out by this with a small quantity of energy to be additionally fed. The quantity of auxiliary material to be pyrolysed, used in the at least one filter device is preferably reduced by this. Optionally, after the carrying out of the pyrolysis process, an additional mechanical processing operation, for example a grinding process, can also be carried out by means of a grinding device.

The exhaust air is preferably fed from a thermal processing device of an exhaust air cleaning device to the filter installation or the painting installation.

In particular when auxiliary filter material present in the filter device is loosened in the receiving container by means of a stirrer or a paddle mixer, it may be provided that elements for grinding the auxiliary filter material are integrated in the stirrer or in the paddle mixer. Thus, for example, grinding discs can be mounted on a shaft of the stirrer or the paddle mixer or in a ball mill integrated in the shaft. Furthermore, it may be provided that at least a part of the shaft of the stirrer or the paddle mixer is configured as a pin mill.

Unloaded auxiliary filter material and auxiliary filter material loaded with paint overspray are preferably mixed in a storage device (a silo, in particular a blending silo, which comprises a mixing device, for example is provided with mixing tools) and/or by means of at least two dispensing members, which, for example, controlled or regulated, combine unloaded and loaded auxiliary filter material in a (predetermined) ratio.

A mechanical treatment device may, for example, comprise grinding balls, which are configured to be made to move by means of a stirrer, for example in a receiving container. The movement of the grinding balls can then lead to a breaking up of agglomerates of paint overspray and auxiliary filter material, it already being possible to ensure reliable grinding of the agglomerates at a very low rotational speed, as the residence time of the auxiliary filter material in the receiving container is very long (several hours to several days). The auxiliary filter material is thus preferably permanently ground during filter operation of the filter device and therefore also kept so fine even without a removal and an external processing that fresh paint overspray is constantly absorbable, ideally up to the physical absorption limit (literature value for moisture absorption: about 27% w/w (percentage mass proportion of the absorbed substance based on the total mass of the unloaded auxiliary filter material)). A grid on a removal opening (suction connecting piece) of the receiving container can prevent the grinding balls inadvertently being removed from the receiving container when the system of auxiliary filter material and paint overspray is removed.

The processing device, in particular at least one mechanical treatment device of the processing device, preferably allows the mean grain size of the system of paint overspray and auxiliary filter material to be reduced to a value of below about 100 µm, preferably below about 50 µm, in particular below about 30 µm, for example below about 10 µm.

Further features and/or advantages of the invention are the subject of the following description and the graphical view of embodiments.

DETAILED DESCRIPTION OF THE DRAWINGS

Figure 1:
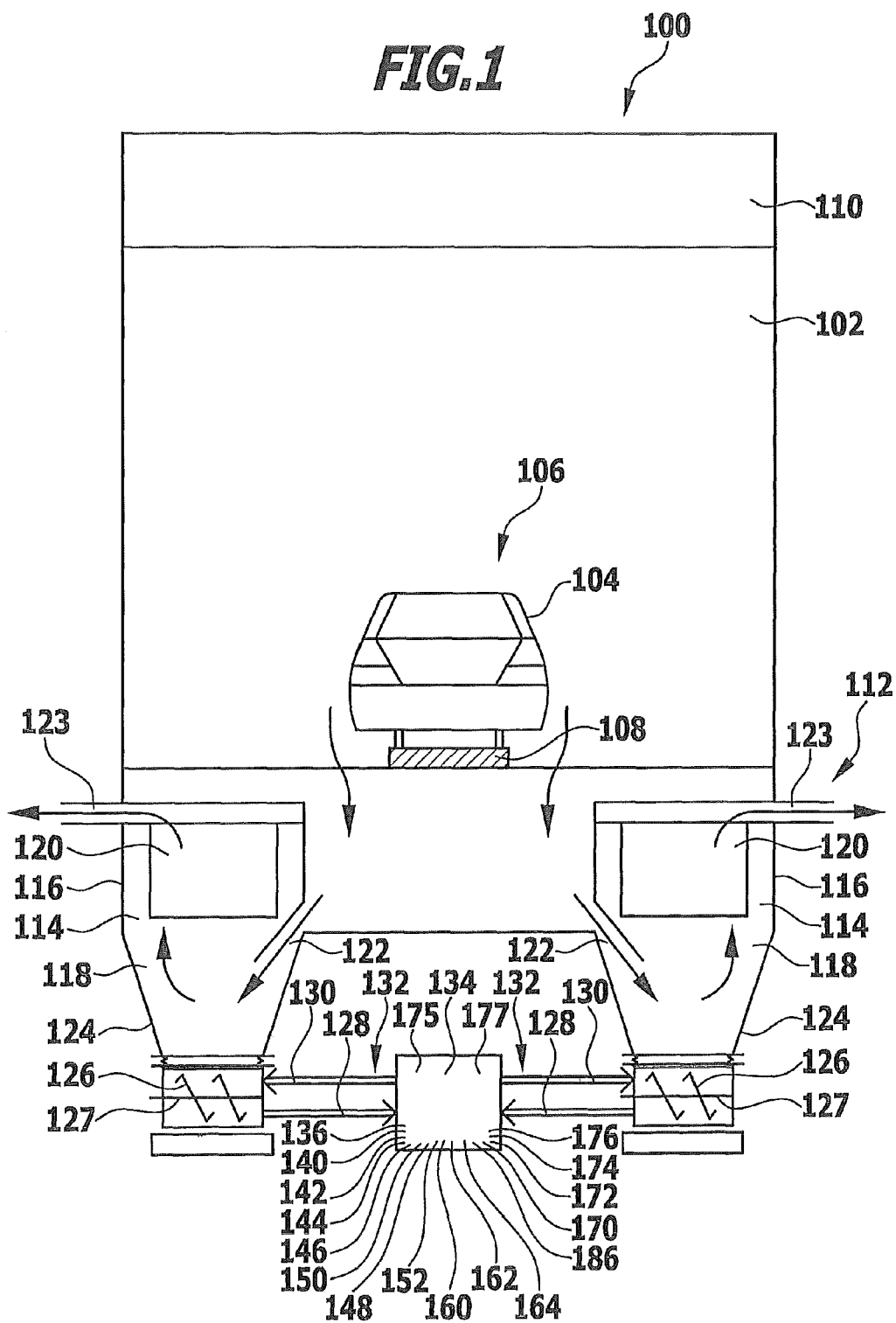
FIG. 1 shows a schematic vertical cross-section through a painting installation for painting workpieces.

The same or functionally equivalent elements are provided with the same reference numerals in all the figures.

A painting installation shown in FIG. 1 and designated as a whole by 100 comprises a painting booth 102, in which workpieces 104, for example vehicle bodies, are configured to have paint applied (are paintable).

The workpieces 104 are feedable for this purpose by means of a workpiece conveying device 108 to an application region 106 of the painting booth 102 and are removable again.

The painting installation 100 furthermore comprises a plenum 110 arranged above the painting booth 102, by means of which air is feedable to the application region 106 in the painting booth 102.

Furthermore, the painting installation 100 comprises a filter installation 112 arranged below the painting booth 102, by means of which filter installation the air, which is guided through the application region 106 and has absorbed paint overspray by the application of paint on the workpieces 104, can be cleaned.

The filter installation 112 comprises a plurality of filter devices 114.

Each filter device 114 comprises a housing 116, which delimits a raw gas chamber 118 and in which at least one filter element 120 is arranged, Furthermore, the filter device 114 comprises an inlet channel 122, through which a raw gas flow, which is formed by the air loaded with paint overspray and guided through the application region 106, can flow into the raw gas chamber 118 of the filter device 114.

The filter device 114 is configured as a dry filter device, in other words, a cleaning of the raw gas flow takes place substantially without the addition of a liquid to the filter elements 120. Rather, an auxiliary filter material can be fed to the raw gas flow, said auxiliary filter material preferably absorbing a liquid proportion in the paint overspray and being able to be deposited together with the paint overspray on the filter element 120. A clean gas flow is this obtained, which leaves the filter device 114 through a clean gas line 123.

By means of the depositing of the system of paint overspray and auxiliary filter material, a barrier layer or a protective layer, which can easily be cleaned off the filter elements 120, is formed on the filter elements 120.

The filter device 114 is therefore a regenerable filter device 114, which can be regenerated and used again without an exchange of filter elements 120.

The system of auxiliary filter material and paint overspray cleaned off the filter elements 120 can be received in a receiving container 124 of the filter device 114, which is arranged below the filter element 120.

A mixing mechanism 127 is used to mix the system of paint overspray and auxiliary filter material in the receiving container 124.

An auxiliary filter material introduction mechanism 126 is formed, for example, by the mixing mechanism 127 in the receiving container 124 and is used to introduce auxiliary filter material into the raw gas flow flowing through the raw gas chamber 118.

The system of paint overspray and auxiliary filter material arranged in the receiving container 124 can be removed from the receiving container 124 by means of a removal device 128.

Fresh or processed auxiliary filter material can be fed to the filter device 114 by means of a feed device 130.

The removal device 128 and the feed device 130 are a component of a conveying device 132 for conveying auxiliary filter material and/or a system of paint overspray and auxiliary filter material.

During the filter operation of the filter installation 112, the auxiliary filter material arranged in the filter devices 114 becomes more and more contaminated over time with paint overspray. As a result, the ability of the auxiliary filter material to bind further paint overspray and therefore avoid a permanent contamination of the filter elements 120, is impaired.

The auxiliary filter material arranged in the filter devices 114 therefore has to be replaced at regular intervals by fresh auxiliary filter material.

However, a processing of the auxiliary filter material can basically take place so that the auxiliary filter material already used once or repeatedly can be at least partially used again as processed auxiliary filter material in the filter installation 112.

For this purpose, the filter installation 112 comprises a processing device 134, by means of which the system of paint overspray and auxiliary filter material can be processed.

The processing device 134, in this case, comprises, in particular, at least one comminution device 136, by means of which agglomerates of paint overspray and auxiliary filter material can be broken up, so that the average grain size of the system of paint overspray and auxiliary filter material can be reduced.

The processing device 134 preferably comprises at least one thermal treatment device 140, at least one mechanical treatment device 160 and/or at least one pneumatic treatment device 170.

A thermal treatment device 140 may, for example, be configured as a heating device 142, as a cooling device 144, as a combustion device 146, as a pyrolysis device 148 and/or as a post-combustion device 150. A combustion device 146 is, for example, a rotary furnace 152.

A mechanical treatment device 160 may, for example, be a mechanical grinding device 162. In particular, a grinding device 162 may be a mill 164, by means of which the system of paint overspray and auxiliary filter material can be ground to reduce the mean grain size.

A pneumatic treatment device 170 may, in particular, be a pneumatic grinding device 172, a swirling device 174 and/or a compressed air device 176. In particular, the system of paint overspray and auxiliary filter material can be swirled by means of a pneumatic treatment device 170 and thereby comminuted and/or fed to the raw gas flow guided through the raw gas chamber 118 of the filter device 114. At least one pneumatic treatment device 170 is preferably arranged for this purpose in the filter device 114, in particular in the receiving container 124.

It may basically be provided that a processing of the system of paint overspray and auxiliary filter material takes place in at least one filter device 114, in particular at least one receiving container 124. Thus, it may, for example, be provided that at least one mechanical treatment device 160 and/or at least one pneumatic treatment device 170 to process the system of paint overspray and auxiliary filter material is arranged in the filter device 114, in particular in the receiving container 124.

It is preferably provided that a processing of the system of paint overspray and auxiliary filter material can be carried out by means of the processing device 134 outside at least one filter device 114.

In particular, the system of paint overspray and auxiliary filter material can be conveyed for this purpose by means of the conveying device 132 from the filter devices 114 to the processing device 134 and back.

The painting installation 100 shown in FIG. 1 functions as follows:

In the application region 106 of the painting booth 102 of the painting installation 100, the workpiece 104 is painted, so the air flowing through the painting booth 102 is loaded with paint overspray.

The air loaded with paint overspray is fed as a raw gas flow to the filter installation 112.

The raw gas flow is guided by way of the inlet channels 122 into the raw gas chambers 118 of the filter devices 114 of the filter installation 112. Auxiliary filter material is introduced into the raw gas flow by means of auxiliary filter material introduction mechanisms 126.

The paint overspray from the raw gas flow accumulates on the auxiliary filter material and/or on a protective layer of auxiliary filter material on the at least one filter element 120 of each filter device 114 and is thus separated from the raw gas flow.

The thus cleaned gas flow then leaves the filter device 114 as a clean gas flow by way of the clean gas line 123.

The function of the auxiliary filter material is increasingly impaired by the accumulation of paint overspray on the auxiliary filter material with the continuing filter operation of the filter devices 114, so the auxiliary filter material has to be exchanged at regular intervals and has to be processed.

In the embodiment of the painting installation 100 shown in FIG. 1, a processing device 134 is generally provided for this, to which the system of paint overspray and auxiliary filter material arranged in the receiving container 124 is feedable by means of the conveying device 132.

A mean grain size of the system of paint overspray and auxiliary filter material is, in particular, reduced in the processing device 134 by breaking up agglomerates of paint overspray and auxiliary filter material.

The processed system of paint overspray and auxiliary filter material can then again be fed as processed auxiliary filter material by means of the conveying device 132 to the filter devices 114.

To control and/or regulate the filter installation 112, in particular the processing device 134, at least one control device 175 and/or at least one regulating device 177 is provided.

FIG. 1 shows the filter installation 112 with a processing device 134, not specified in more detail, for the general description of the mode of functioning of the filter installation 112. Individual embodiments of filter installations 112 with various processing devices 134 are shown in FIGS. 2 to 10 described below.

Figure 2:
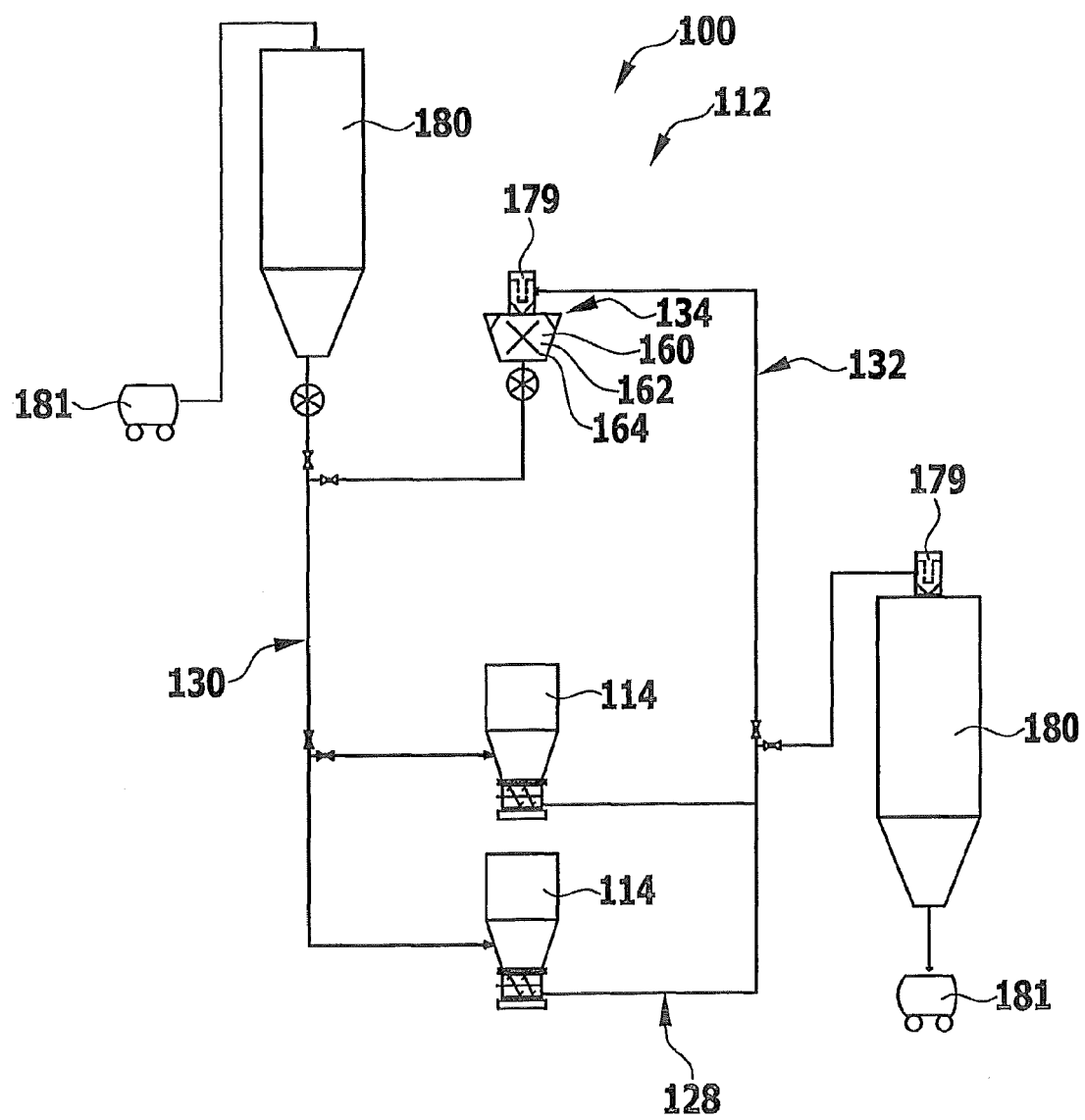
FIG. 2 shows a schematic view of a first embodiment of a filter installation of the painting installation from FIG. 1, the filter installation comprising a processing device for processing an auxiliary filter material, which is configured as a grinding device.

A first embodiment of a filter installation 112 shown in FIG. 2, apart from the filter devices 114 and the conveying device 132, comprises two storage devices 180, in which auxiliary filter material and/or a system of paint overspray and auxiliary filter material is absorbable and storable.

The conveying device 132 uses air as the transporting medium for driving (conveying) the auxiliary filter material and the system of paint overspray and auxiliary filter material, the air being separable by means of separators 179, in order to deposit the auxiliary filter material and the system of paint overspray and auxiliary filter material at a desired site.

One of the storage devices 180 is used to receive fresh auxiliary filter material not loaded with paint overspray, while the other storage device 180 is used to receive auxiliary filter material loaded with the paint overspray, which is no longer provided for processing and is therefore to be disposed of.

Transporting devices 181, for example lorries, are used to deliver fresh auxiliary filter material and/or to remove auxiliary filter material to be disposed of.

The processing device 134 comprises, in the first embodiment of the filter installation 112 shown in FIG. 2, a mechanical treatment device 160, which is configured as a grinding device 162 and to which the system of paint overspray and auxiliary filter material from the filter devices 114 is feedable by means of the conveying device 132.

The system of paint overspray and auxiliary filter material can be ground by means of the grinding device 162 and fed again to the filter devices 114 by means of the conveying device 132.

Otherwise, the first embodiment of the filter installation 112 shown in FIG. 2 coincides with respect to structure and function with the filter installation 112 described in general in FIG. 1, so that, to this extent, reference is made to the above description thereof.

Figure 3:
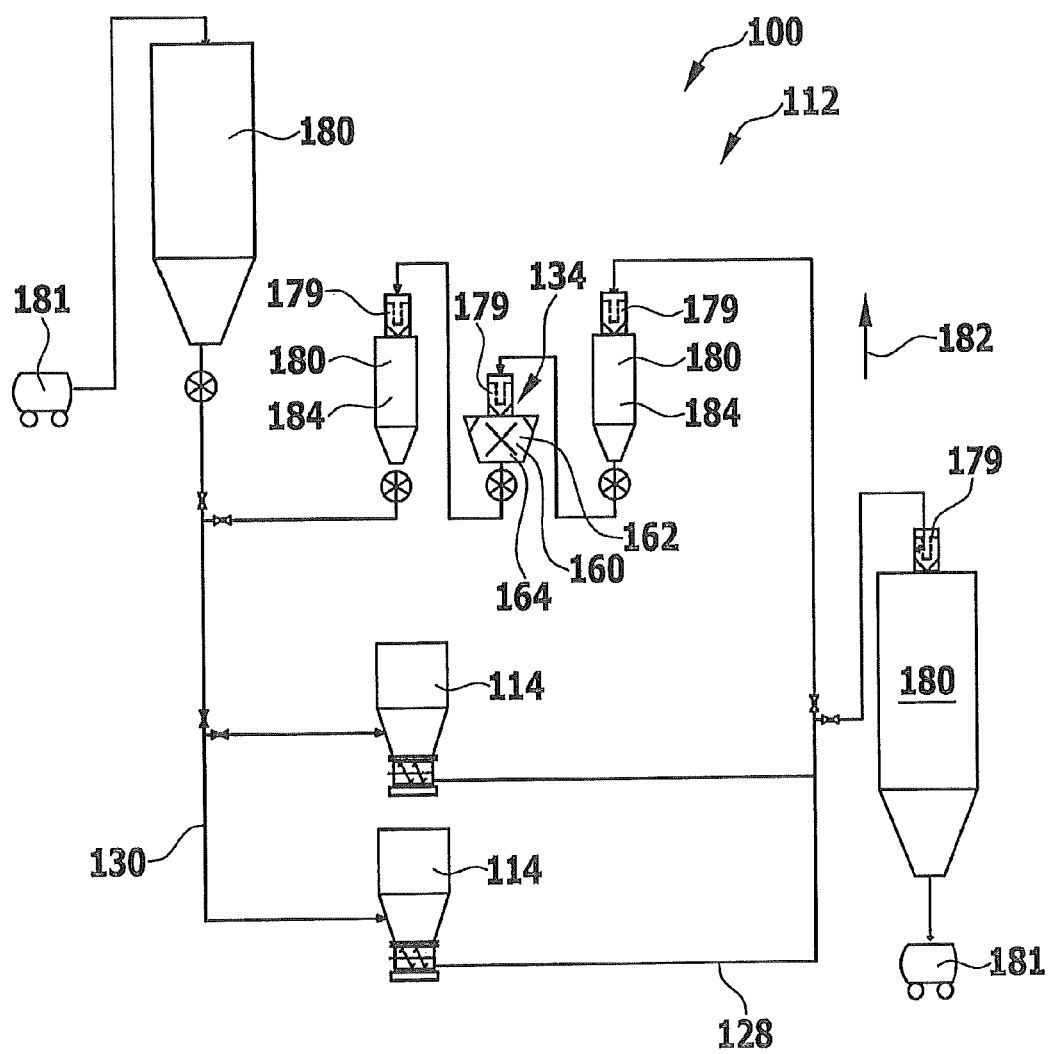
FIG. 3 shows a schematic view corresponding to FIG. 2 of a second embodiment of the filter installation, in which two intermediate storage devices are provided for the intermediate storage of auxiliary filter material.

A second embodiment of a filter installation 112 shown in FIG. 3 differs from the first embodiment shown in FIG. 2 substantially in that an intermediate storage device 184 is provided for the intermediate storage of the system of paint overspray and auxiliary filter material, in each case, before and after the processing device 134 with regard to a conveying direction 182 of the system of paint overspray and auxiliary filter material.

The intermediate storage device 184 arranged before the processing device 134 with regard to the conveying direction 182 is used for the intermediate storage of the system of paint overspray and auxiliary filter material still to be processed.

The intermediate storage device 184 arranged behind the processing device 134 with regard to the conveying direction 182 is used to absorb the system of paint overspray and auxiliary filter material processed by means of the processing device 134.

Otherwise, the second embodiment shown in FIG. 3 of the filter installation 112 coincides with respect to structure and function with the first embodiment shown in FIG. 2, so that, to this extent, reference is made to the above description thereof.

Figure 4:
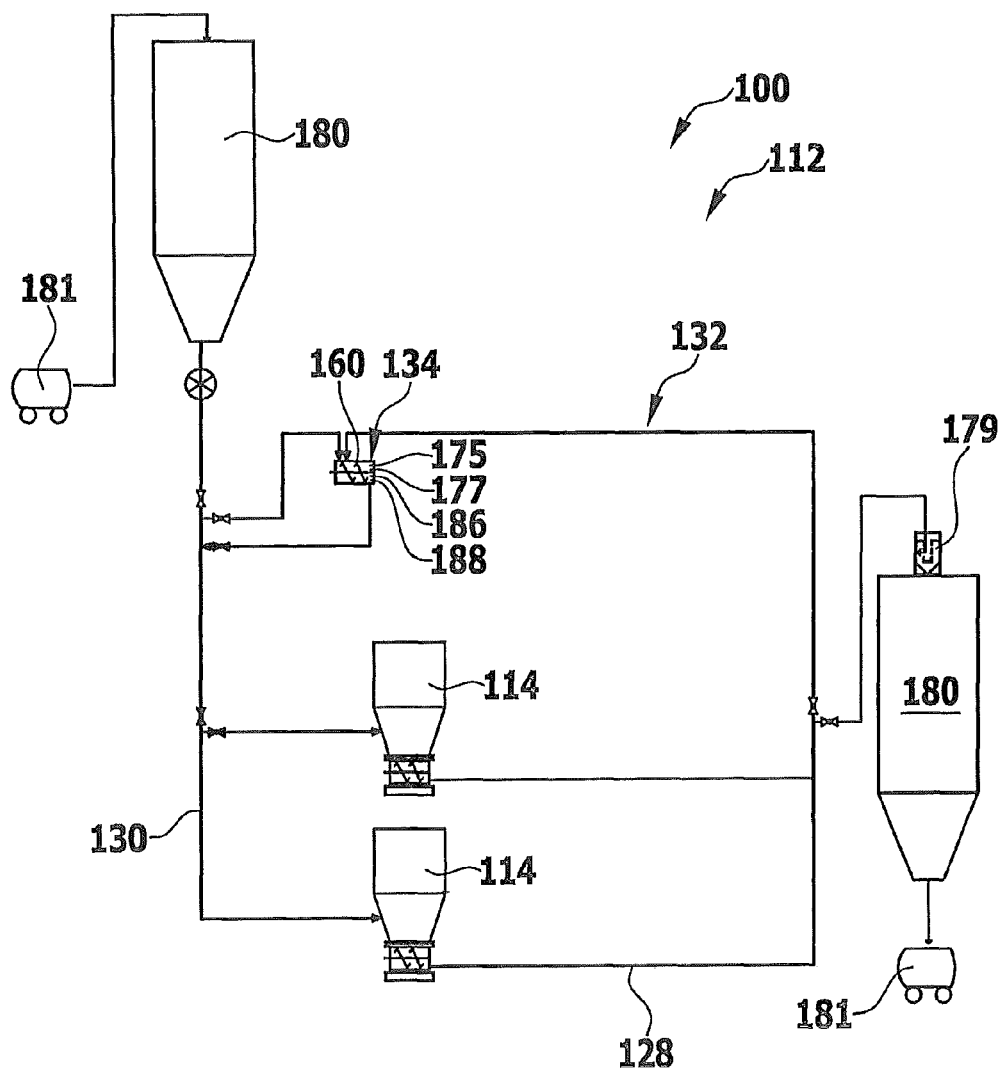
FIG. 4 shows a schematic view corresponding to FIG. 2 of a third embodiment of a filter installation, in which a mixing device for mixing fresh auxiliary filter material with auxiliary filter material loaded with paint overspray is provided.

A third embodiment of a filter installation 112 shown in FIG. 4 differs from the first embodiment shown in FIG. 2 substantially in that the processing device 134 is configured as a mixing device 186.

The system of paint overspray and auxiliary filter material removed from the filter devices 114 can be mixed with fresh, unloaded auxiliary filter material from the storage device 180 by means of the mixing device 186, so that a reusable system of paint overspray and auxiliary filter material, in other words a processed system of paint overspray and auxiliary filter material, can be obtained.

The mixing device 186 preferably comprises a measuring device 188, by means of which it is determinable to what degree the auxiliary filter material is loaded with paint overspray. It can thus be determined, to what extent fresh, unloaded auxiliary filter material has to be mixed with the system of paint overspray and auxiliary filter material to ensure the filter function of the auxiliary filter material during renewed feeding to the filter device 114.

The control device 175 and/or the regulating device 177 are used to control and/or regulate the mixing device 186, in particular depending on the values determined by means of the measuring device 188.

Otherwise, the third embodiment of the filter installation 112 shown in FIG. 4 coincides with respect to structure and function with the first embodiment shown in FIG. 2, so that, to this extent, reference is made to the above description thereof.

Figure 5:
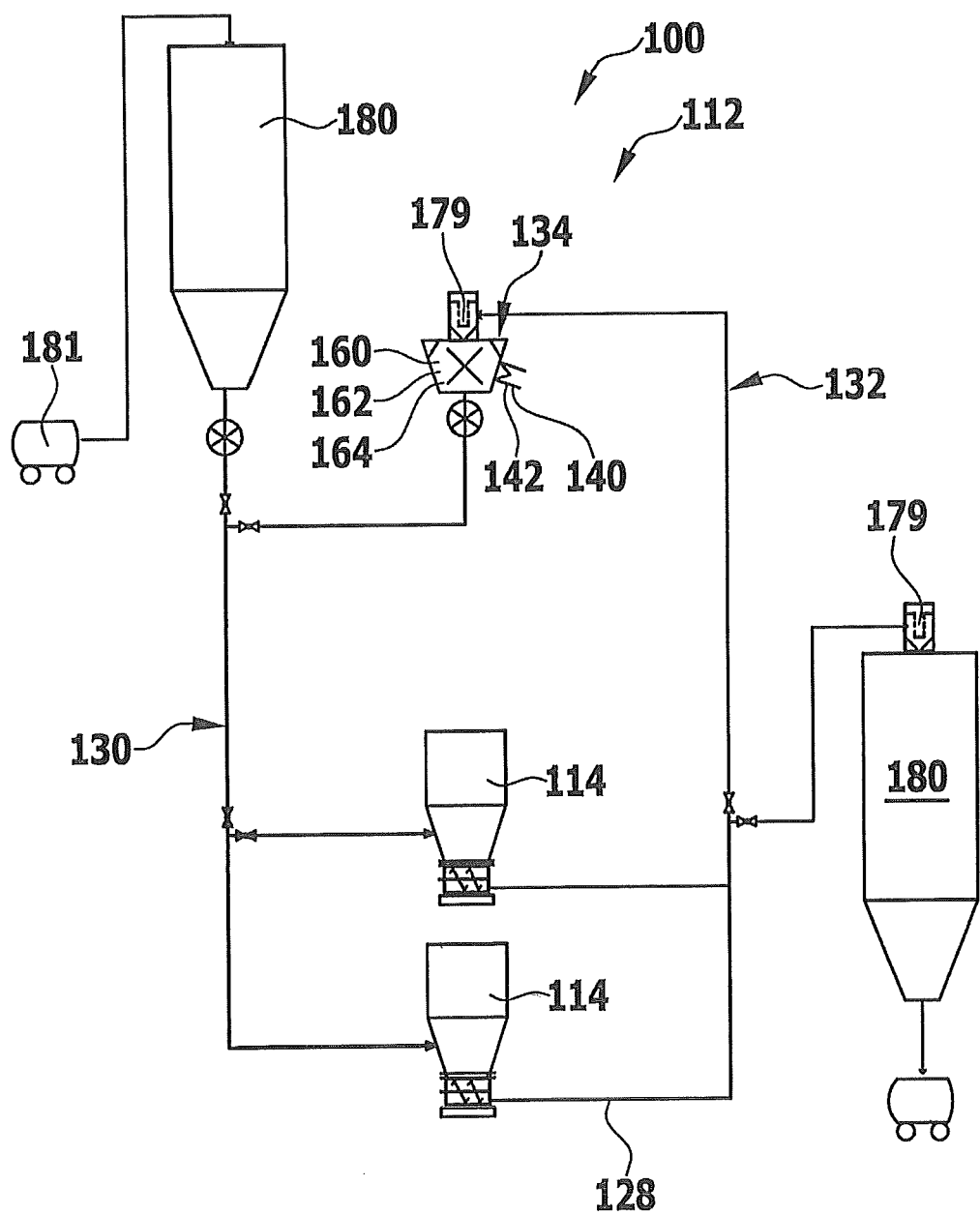
FIG. 5 shows a schematic view corresponding to FIG. 2 of a fourth embodiment of a filter installation, in which the processing device comprises a thermal treatment device for heating processed auxiliary filter material.

A fourth embodiment of a filter installation 112 shown in FIG. 5 differs from the first embodiment shown in FIG. 2 substantially in that the processing device 134 comprises a mechanical treatment device 160, which is provided with a thermal treatment device 140.

The thermal treatment device 140 is configured here as a heating device 142 and is used to heat the system of paint overspray and auxiliary filter material arranged in the mechanical treatment device 160.

The system of paint overspray and auxiliary filter material can be heated by means of the heating device 142, in particular to a temperature of between about 50° C. and about 100° C. Solvents present in the system of paint overspray and auxiliary filter material can thus be evaporated (vaporized).

Furthermore, the system of paint overspray and auxiliary filter material can be heated to a temperature of between about 100° C. and about 180° C. by means of the heating device 142. As a result, the paint overspray can be hardened, so the system of paint overspray and auxiliary filter material can more easily be ground by means of the mechanical treatment device 160.

Moreover, the fourth embodiment of the filter installation 112 shown in FIG. 5 coincides with respect to function and structure with the first embodiment shown in FIG. 2, so that, to this extent, reference is made to the above description thereof.

Figure 6:
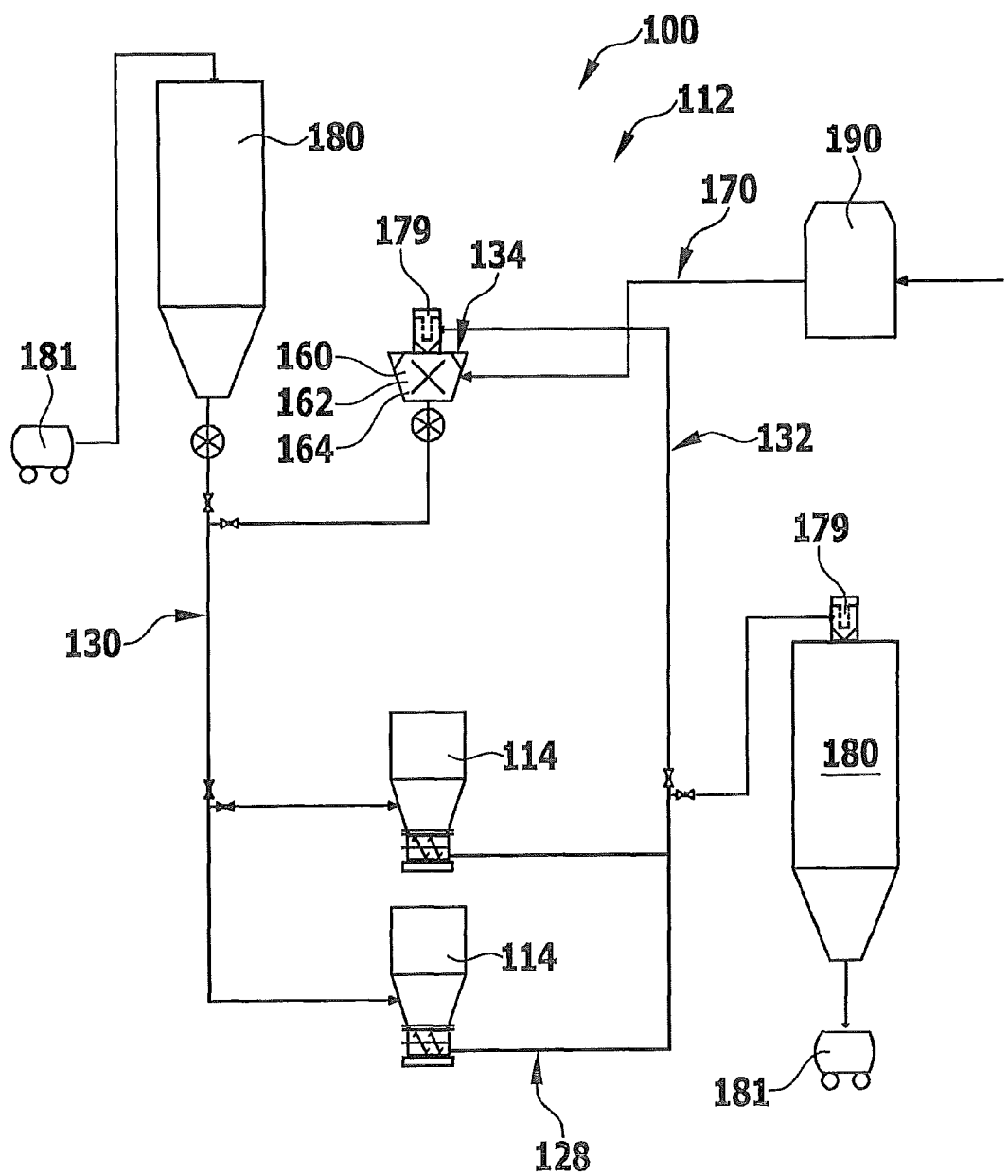
FIG. 6 shows a schematic view corresponding to FIG. 2 of a fifth embodiment of a filter installation, in which heated air from a workpiece drying device to dry painted workpieces is feedable to the auxiliary filter material to be processed.

A fifth embodiment of a filter installation 112 shown in FIG. 6 differs from the fourth embodiment shown in FIG. 5 substantially in that the processing device 134 comprises a mechanical treatment device 160, to which exhaust air from a workpiece drying device 190 for drying painted workpieces 104 is feedable.

The processing device 134 therefore comprises a pneumatic treatment device 170, by means of which air, in particular hot air, is configured to be applied to the system of paint overspray and auxiliary filter material.

A paint proportion in the system of paint overspray and auxiliary filter material, in particular, can be dried by means of exhaust air from the workpiece drying device 190, so that an easier mechanical processing of the system of paint overspray and auxiliary filter material is possible, for example by grinding the system of paint overspray and auxiliary filter material by means of a mechanical treatment device 160 configured as a grinding device 162.

Otherwise, the fifth embodiment of a filter installation 112 shown in FIG. 6 coincides with respect to structure and function with the fourth embodiment shown in FIG. 5, so that, to this extent, reference is made to the above description thereof.

Figure 7:
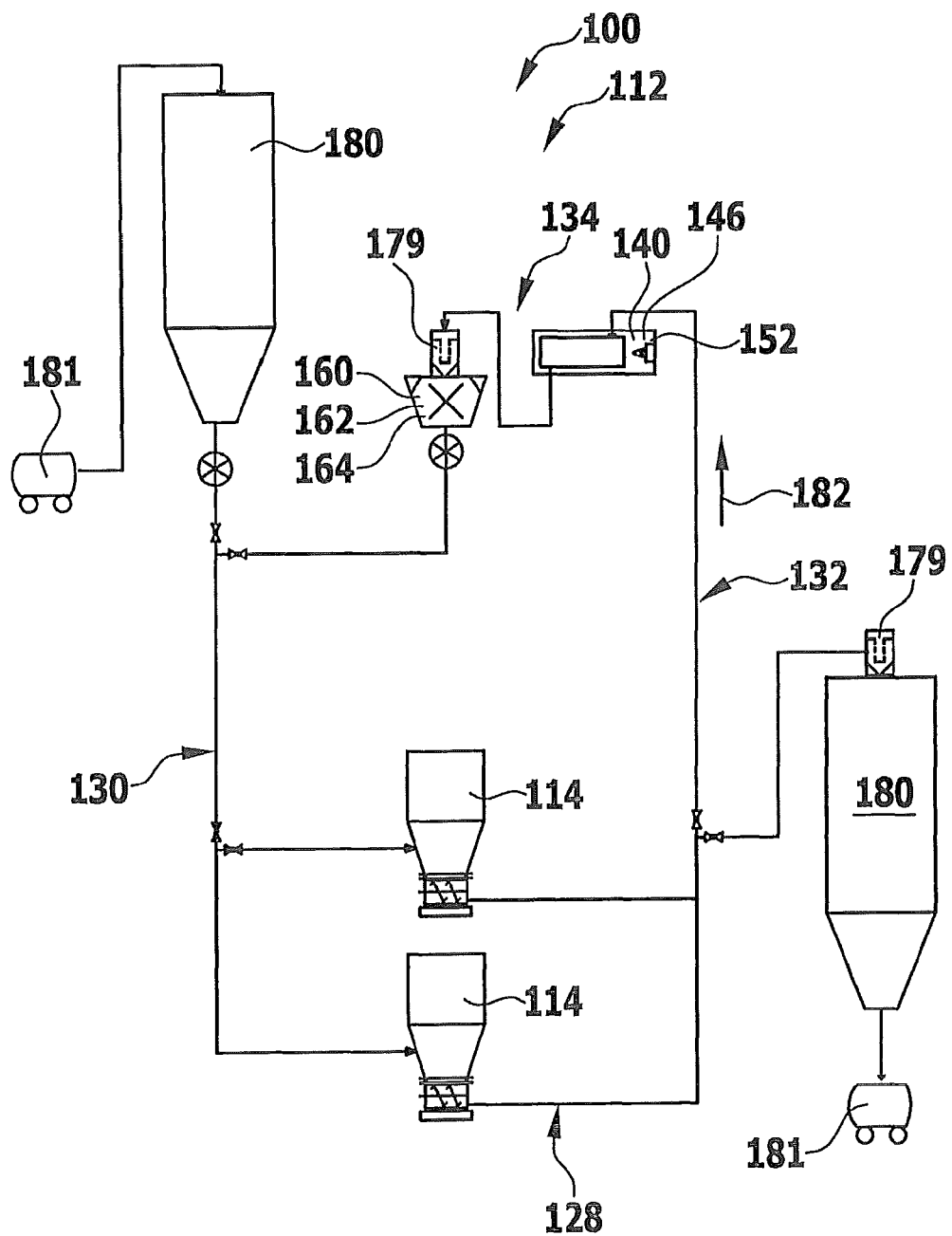
FIG. 7 shows a schematic view corresponding to FIG. 2 of a sixth embodiment of a filter installation, in which a processing device is provided, which comprises a combustion device.

A sixth embodiment of a filter installation 112 shown in FIG. 7 differs from the first embodiment of a filter installation 112 shown in FIG. 2 substantially in that a thermal treatment device 140 configured as a combustion device 146, for example, as a rotary furnace 152, is provided before the mechanical treatment device 160 with respect to the conveying direction 182.

The system of paint overspray and auxiliary filter material from the filter devices 114 can be fed to the thermal treatment device 140 in order to combust an organic proportion in the system of paint overspray and auxiliary filter material. In particular when the thermal treatment device 140 is configured as a rotary furnace 152, by means of the thermal treatment device 140, a treatment of the system of paint overspray and auxiliary filter material can take place, on the one hand, and a conveyance of the system of paint overspray and auxiliary filter material, in particular a conveyance to the mechanical treatment device 160 can take place simultaneously.

Otherwise, the sixth embodiment of a filter installation 112 shown in FIG. 7 coincides with respect to structure and function to the first embodiment shown in FIG. 2, so that, to this extent, reference is made to the above description thereof.

Figure 8:
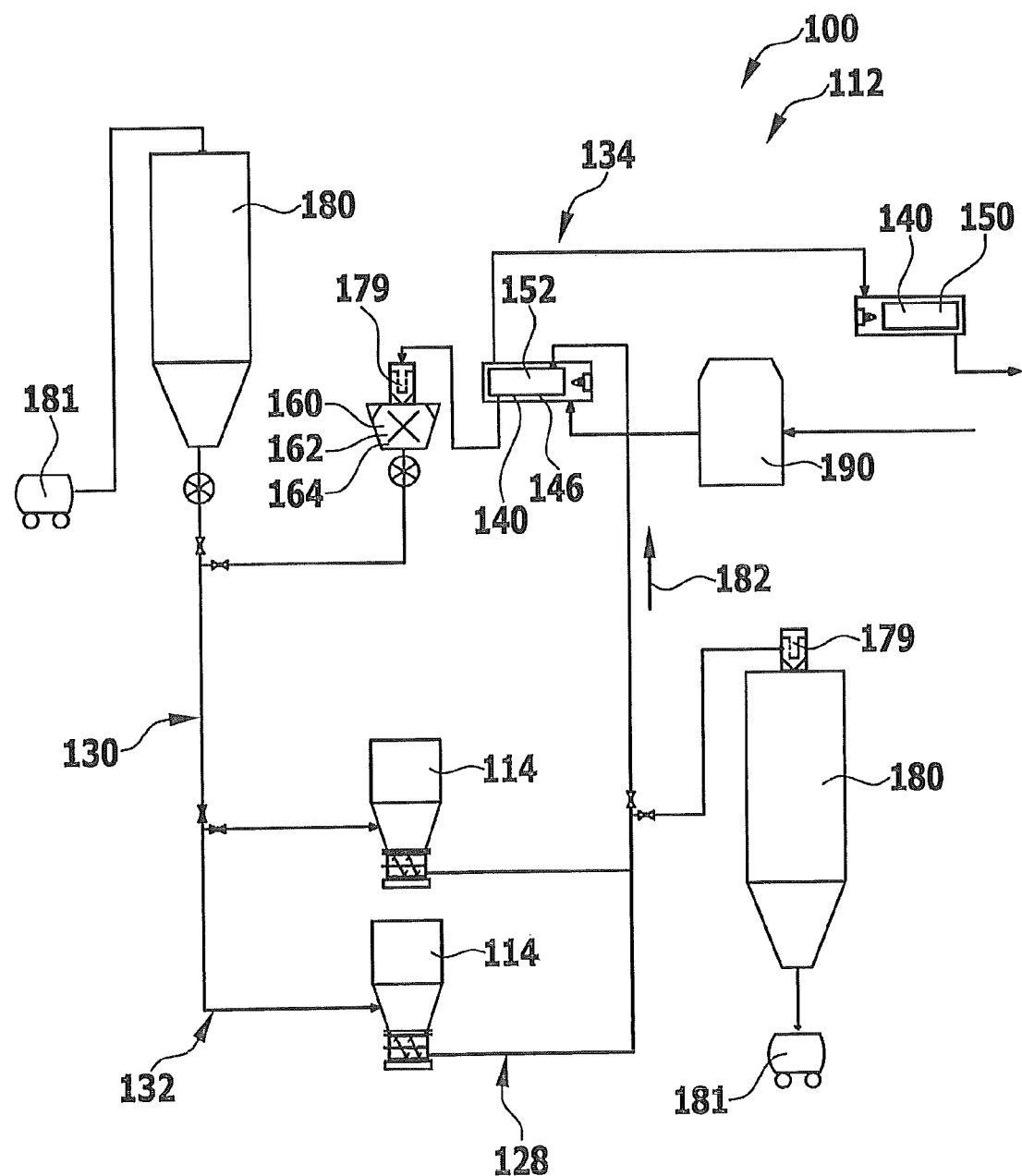
FIG. 8 shows a schematic view corresponding to FIG. 2 of a seventh embodiment of a filter installation, in which the processing device comprises a combustion device and a post-combustion device, exhaust air from a workpiece drying device to dry painted workpieces being feedable to the combustion device.

A seventh embodiment of a filter installation 112 shown in FIG. 8 differs from the sixth embodiment shown in FIG. 7 substantially in that the processing device 134, in addition to the mechanical treatment device 160 and the thermal treatment device 140 configured as a combustion device 146, comprises a thermal treatment device 140 configured as a post-combustion device 150.

The post-combustion device 150 is used for the post-combustion of exhaust air, in particular the exhaust air from the thermal treatment device 140 configured as a combustion device 146.

The system of paint overspray and auxiliary filter material is therefore not fed to the post-combustion device 140, but only the exhaust air from the combustion device 146 configured as a rotary furnace 152.

The air required to operate the combustion device 146 configured as a rotary furnace 152, in the seventh embodiment of the filter installation 112 shown in FIG. 8 is provided from a workpiece drying device 190 to dry painted workpieces 104.

In the seventh embodiment of the filter installation 112 shown in FIG. 8, an air flow is therefore produced from the workpiece drying device 190 to the thermal treatment device 140 configured as a combustion device 146 and finally to the thermal treatment device 140 configured as a post-combustion device 150. An air guidance of this type has the advantage that the temperatures required to operate the thermal treatment device 140 can be achieved more easily and with less additional energy input. As a result, fuel, for example gas, in particular natural gas, for the operation of the thermal treatment device 140 can be saved.

Otherwise, the seventh embodiment of the filter installation 112 shown in FIG. 8 coincides with respect to structure and function with the sixth embodiment shown in FIG. 7, so that, to this extent, reference is made to the above description thereof.

Figure 9:
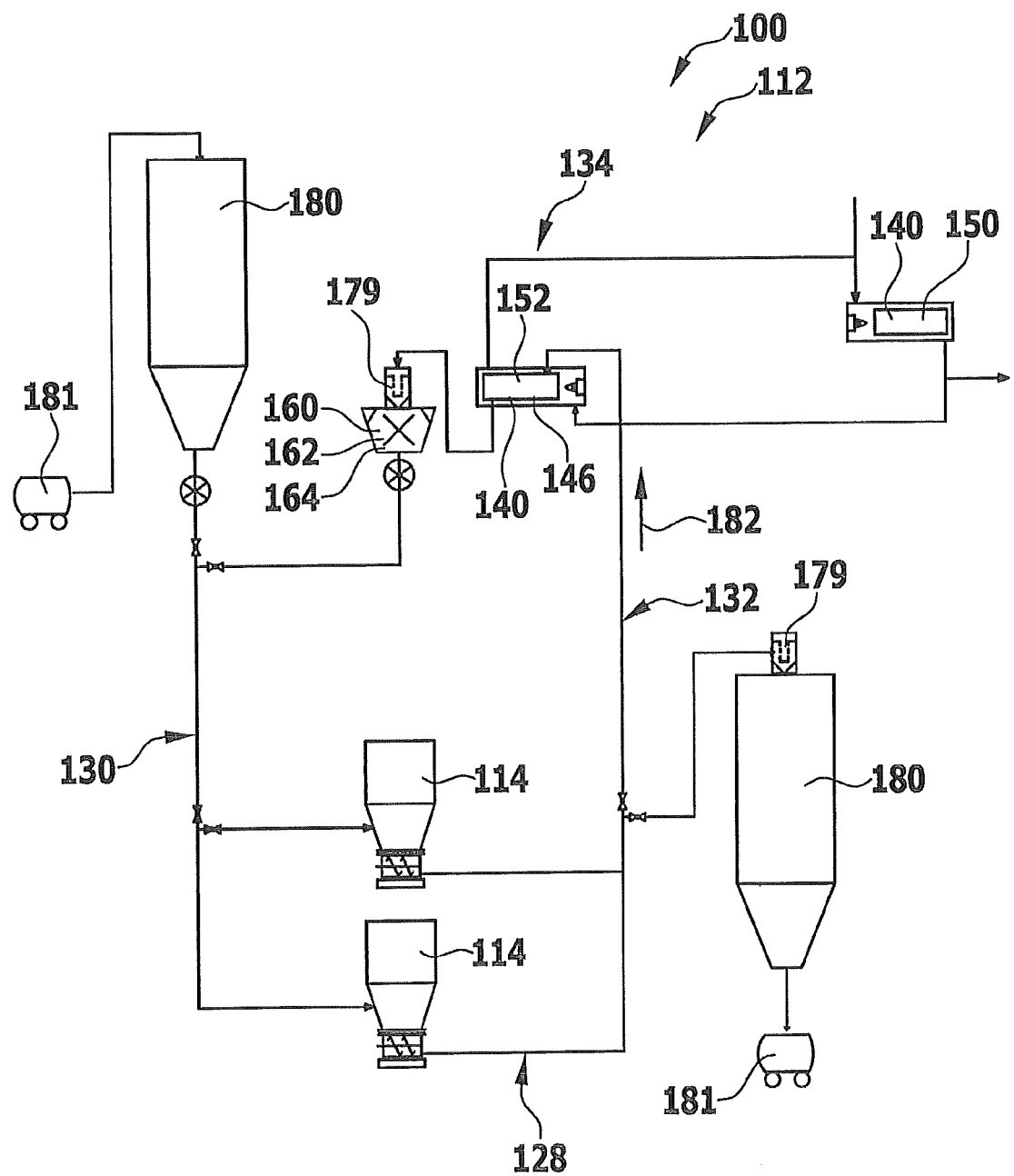
FIG. 9 shows a schematic view corresponding to FIG. 2 of an eighth embodiment of a filter installation, in which the processing device comprises a combustion device and a post-combustion device, exhaust air from the post-combustion device being feedable to the combustion device.

An eighth embodiment of a filter installation 112 shown in FIG. 9 differs from the seventh embodiment shown in FIG. 8 substantially in that the air fed to the combustion device 146 does not come from the workpiece drying device 190, but that exhaust air from the thermal treatment device 140 configured as a post-combustion device 150 is used. A circulation of the air flow (or at least a part of the air flow) can thus be realized by the combustion device 146 and the post-combustion device 150.

Otherwise, the eighth embodiment of a filter installation 112 shown in FIG. 9 coincides with respect to structure and function to the seventh embodiment shown in FIG. 8, so that, to this extent, reference is made to the above description thereof.

Figure 10:
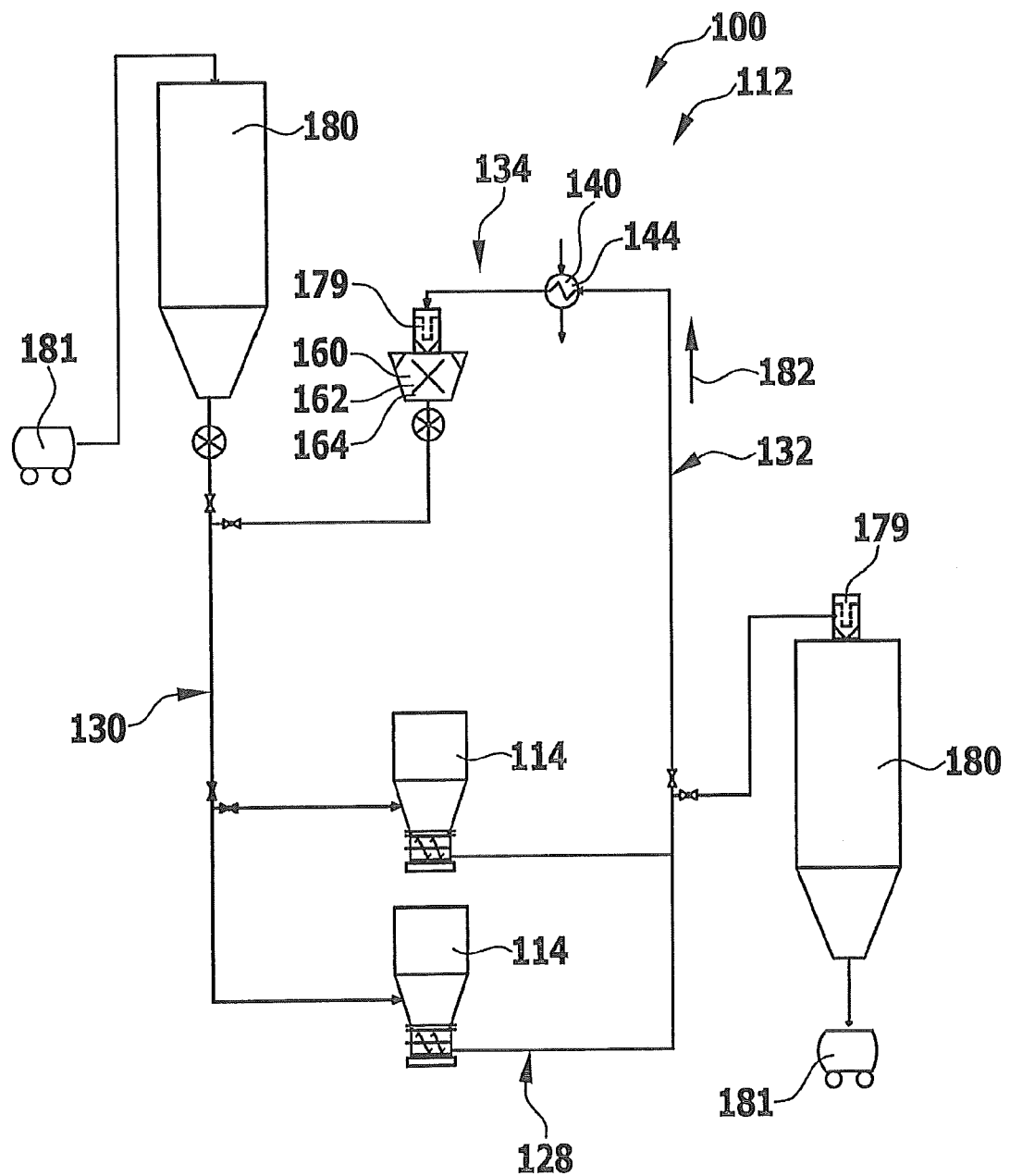
FIG. 10 shows a schematic view corresponding to FIG. 2 of a ninth embodiment of a filter installation, in which the processing device comprises a thermal treatment device configured as a cooling device.

A ninth embodiment of a filter installation 112 shown in FIG. 10 differs from the first embodiment shown in FIG. 2 substantially in that the processing device 134, in addition to the mechanical treatment device 160, comprises a thermal treatment device 140 configured as a cooling device 144.

The cooling device 144 is, in this case, preferably arranged before the mechanical treatment device 160 with respect to the conveying direction 182 of the system of paint overspray and auxiliary filter material.

The system of paint overspray and auxiliary filter material can be cooled by means of the cooling device 144. In particular, the system of paint overspray and auxiliary filter material can be cooled down by means of the cooling device 144 to a temperature, which is below a glass transition temperature of the paint overspray. For example, the system of paint overspray and auxiliary filter material can be cooled down to a temperature of about 5° C.

The cooling of the system of paint overspray and auxiliary filter material leads to the fact that the paint proportion in the system becomes brittle and can thus be more easily mechanically treated, in particular more easily ground.

In a further embodiment (not shown) of a filter installation 112, it may be provided that the cooling of the system of paint overspray and auxiliary filter material does not take place before the mechanical treatment device 160, but takes place in the mechanical treatment device 160.

Otherwise, the ninth embodiment of a filter installation 112 shown in FIG. 10 coincides with respect to structure and function to the first embodiment shown in FIG. 2, so that, to this extent, reference is made to the above description thereof.

Figure 11:
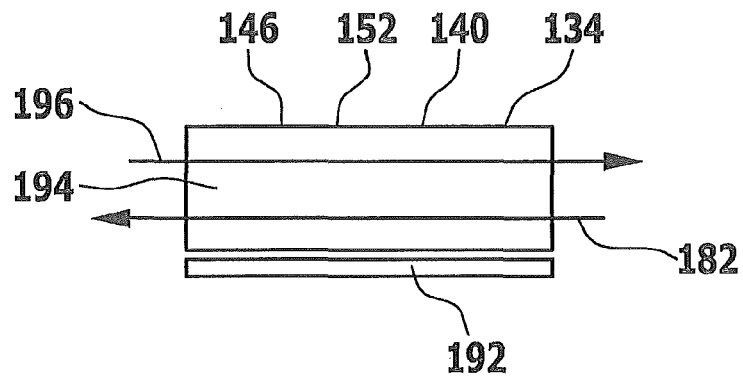
FIG. 11 shows a schematic view of a rotary furnace operated by the counter-flow principle.
Figure 12:
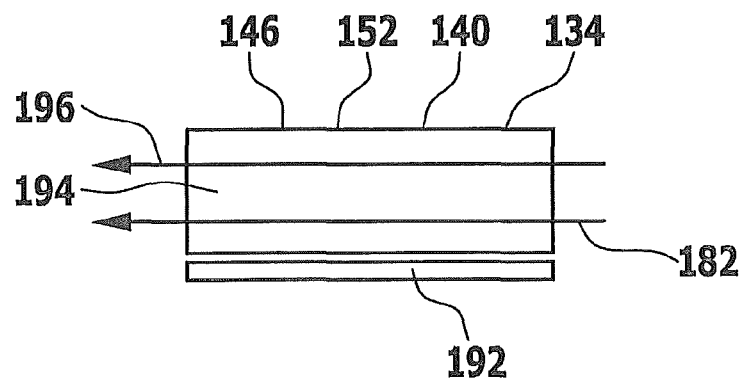
FIG. 12 shows a schematic view of a rotary furnace operated by the co-current flow principle.
Figure 13:
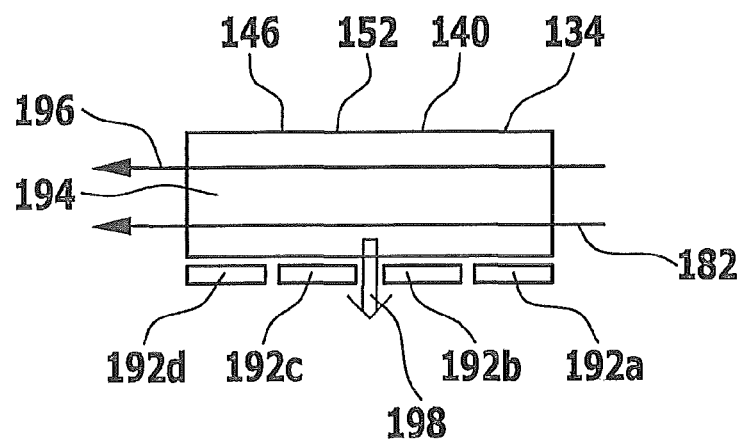
FIG. 13 shows a schematic view of a rotary furnace, which comprises a plurality of heating zones and a removal device.

Various embodiments of combustion devices 146 are shown in FIGS. 11 to 13. In particular, the combustion devices 146 are rotary furnaces 152.

In the embodiment shown in FIG. 11, it is provided that the rotary furnace 152 has a heating zone 192 for heating an interior 194 of the rotary furnace 152.

The rotary furnace 152 may be operated here by the counter flow principle, in other words, the system of paint overspray and auxiliary filter material is conveyed in a conveying direction 182 through the interior 194 of the rotary furnace 152, which opposes a gas conveying direction 196, in which a gas, in particular process gas, is conveyed through the interior 194 of the rotary furnace 152.

The rotary furnace 152 may be made particularly short as a result, as the system of paint overspray and auxiliary filter material introduced into the interior 194 of the rotary furnace 152 comes into direct contact with hot gas, in particular process gas on entering the interior 194 and is therefore processed more quickly.

A second embodiment of a combustion device 146 configured as a rotary furnace 152 shown in FIG. 12 differs from the embodiment shown in FIG. 11 substantially in that the gas conveying direction 196 and the conveying direction 182 of the system of paint overspray and auxiliary filter material are oriented in parallel and in the same direction with respect to one another. The rotary furnace 152 shown in FIG. 12 is therefore operated in co-current flow operation.

As a result, condensates forming can preferably be kept for longer in the hot process gas, so that the probability becomes greater of it also being completely converted. The quantity of tar-like residues forming can thus preferably be reduced.

Otherwise, the embodiment of the rotary furnace 152 shown in FIG. 12 coincides with respect to structure and function with the embodiment shown in FIG. 11, so that, to this extent, reference is made to the above description thereof.

A third embodiment of a combustion device 146 configured as a rotary furnace 152 shown in FIG. 13 differs from the embodiment shown in FIG. 12 substantially in that instead of a single heating zone 192, a plurality of, in particular four, heating zones 192 are provided.

With regard to the gas conveying direction 196 and the conveying direction 182 of the system of paint overspray and auxiliary filter material, which are oriented in parallel and in the same direction with respect to one another, the heating zones 192a, 192b, 192c and 192d are arranged following one another here.

The embodiment of the rotary furnace 152 shown in FIG. 13 furthermore differs from the embodiment shown in FIG. 12 in that the system of paint overspray and auxiliary filter material, in particular the processed auxiliary filter material, is not removed at one end of the rotary furnace 152 therefrom. Rather, a removal device 198 is provided, by means of which the system of paint overspray and auxiliary filter material can be removed between two heating zones 192, in particular between the heating zone 192b and the heating zone 192c.

A removal device 198 of this type makes it possible to more strongly heat the heating zones 192c and 192d following the removal device 198 in the conveying direction 182 of the system of paint overspray and auxiliary filter material and the gas conveying direction 196. As a result, a complete combustion of the substances escaped from the system of paint overspray and auxiliary filter material can be guaranteed, without an impairment of the auxiliary filter material by overheating it having to be feared.

Otherwise, the embodiment of the rotary furnace 152 shown in FIG. 13 coincides with respect to structure and function with the embodiment shown in FIG. 12, so that, to this extent, reference is made to the above description thereof.

To process the system of paint overspray and auxiliary filter material, basically, individual or a plurality of aspects of the described embodiments of filter installations 112 can be combined as desired with one another. Thus, it may, for example, be provided that the system of paint overspray and auxiliary filter material is firstly fed according to FIG. 7 to a combustion device 146 and then cooled according to FIG. 10 by means of a cooling device 144.

Since a processing of the system of paint overspray and auxiliary filter material takes place in all the described embodiments of the filter installation 112, a particularly material-saving and efficient operation of the filter installation 112, and therefore also of the painting installation 100, is made possible.

Further advantageous embodiments are the following:

1. Filter installation, comprising a filter device (114) for cleaning a raw gas flow loaded with paint overspray, wherein the filter device (114) comprises the following:
    a filter element (120), on which paint overspray from the raw gas flow loaded with paint overspray is configured to be deposited together with the auxiliary filter material fed to the raw gas flow;
    a receiving container (124) to receive a system of paint overspray and auxiliary filter material; and
    a removal device (128) for removing at least a part of the system of paint overspray and auxiliary filter material from the receiving container (124), characterized in that the filter installation (112) comprises a processing device (134) for processing the system of paint overspray and auxiliary filter material.

2. Filter installation according to embodiment 1, characterized in that the processing device (134) comprises a thermal treatment device (140), by means of which the system of paint overspray and auxiliary filter material, to process the system, is thermally treatable.

3. Filter installation according to either of embodiments 1 or 2, characterized in that the processing device (134) comprises a mechanical treatment device (160) and/or a pneumatic treatment device (170), by means of which the system of paint overspray and auxiliary filter material, to process the system, is mechanically treatable and/or loadable with air.

4. Filter installation according to any one of embodiments 1 to 3, characterized in that the filter installation (112) comprises a storage device (180) for receiving and storing auxiliary filter material and/or a system of paint overspray and auxiliary filter material.

5. Filter installation according to embodiment 4, characterized in that the storage device (180) is an intermediate storage device (184) for the intermediate storage of a processed system of paint overspray and auxiliary filter material, the processed system of paint overspray and auxiliary filter material being feedable from the processing device (134) to the intermediate storage device (184) and wherein the processed system of paint overspray and auxiliary filter material for the filter device (114) is providable by means of the intermediate storage device (184).

6. Filter installation according to either of embodiments 4 or 5, characterized in that the storage device (180) is an intermediate storage device (184) for the intermediate storage of a system of paint overspray and auxiliary filter material removed from the receiving container (124) and to be fed to the processing device (134), wherein the system of paint overspray and auxiliary filter material is feedable from the receiving container (124) to the intermediate storage device (184) and wherein the system of paint overspray and auxiliary filter material for the processing device (134) is providable by means of the intermediate storage device (184).

7. Filter installation according to any one of embodiments 1 to 6, characterized in that the filter installation (112) comprises a control device (175) and/or a regulating device (177), by means of which it is determinable whether the auxiliary filter material provided to the filter device (114) for cleaning the raw gas flow is unloaded, fresh auxiliary filter material or a system of paint overspray and auxiliary filter material.

8. Filter installation according to any one of embodiments 1 to 7, characterized in that the filter installation (112) comprises a mixing device (186), by means of which unloaded, fresh auxiliary filter material and a system of paint overspray and auxiliary filter material are combinable and mixable.

9. Method for operating a filter installation (112), in particular a filter installation (112) according to any one of embodiments 1 to 8, comprising the following:
    feeding a raw gas flow loaded with paint overspray to a filter device (114) of a filter installation (112);
    introducing auxiliary filter material into the raw gas flow;
    separating a system of paint overspray and auxiliary filter material and receiving the system in a receiving container (124),
characterized in that at least a part of the system of paint overspray and auxiliary filter material is processed by means of a processing device (134).

10. Method according to embodiment 9, characterized in that the system of paint overspray and auxiliary filter material, to process the system, is thermally treated.

11. Method according to either of embodiments 9 or 10, characterized in that the system of paint overspray and auxiliary filter material, to process the system, is dried, burned, combusted and/or cooled and/or subjected to a pyrolysis process.

12. Method according to any one of embodiments 9 to 11, characterized in that the system of paint overspray and auxiliary filter material, to process the system, is loaded with compressed air.

13. Method according to any one of embodiments 9 to 12, characterized in that at least one auxiliary processing substance is fed to the system of paint overspray and auxiliary filter material to process the system.

14. Method according to any one of embodiments 9 to 13, characterized in that at least two method steps are carried out to process the system of paint overspray and auxiliary filter material.

15. Method according to any one of embodiments 9 to 14, characterized in that at least a part of the system of paint overspray and auxiliary filter material is removed from the receiving container (124) and processed outside the receiving container (124).

That which is claimed:

1. A filter installation, comprising a filter device for cleaning a raw gas flow loaded with paint overspray and a processing device for processing a mixture of paint overspray and auxiliary filter material;
    wherein the filter device comprises the following:
    a filter element, on which paint overspray from the raw gas flow loaded with paint overspray is configured to be deposited together with an auxiliary filter material fed to the raw gas flow;
    a receiving container to receive the mixture of paint overspray and auxiliary filter material; and
    a conveyor for removing at least a part of the mixture of paint overspray and auxiliary filter material from the receiving container;
    wherein the processing device comprises one or more of a heater, a cooler, a dryer, a combustor, and a pyrolyzer, and is adapted to thermally treat the mixture of paint overspray and auxiliary filter material, and wherein the processing device is positioned within the receiving container or is external to the filter device and connected to the conveyor.

2. The filter installation according to claim 1, wherein a part of the mixture of paint overspray and auxiliary filter material is processed in the processing device and is introduceable again as auxiliary filter material into the raw gas flow.

3. The filter installation according to claim 1, wherein the processing device is external to the filter device and connected to the conveyor.

4. The filter installation according to claim 1, wherein the processing device further comprises at least one of a grinder adapted for comminution of the mixture of paint overspray and auxiliary filter material, and a pneumatic treatment device comprising at least one nozzle and configured to apply air to the mixture of paint overspray and auxiliary filter material.

5. The filter installation according to claim 1, wherein the filter installation comprises a storage container for receiving and storing at least one of auxiliary filter material and the mixture of paint overspray and auxiliary filter material.

6. The filter installation according to claim 5, wherein the storage container is positioned to receive a processed mixture of paint overspray and auxiliary filter material from the processing device.

7. The filter installation according to claim 5, wherein the storage container is positioned to receive a mixture of paint overspray and auxiliary filter material removed from the receiving container, and wherein the storage container is in fluid communication with the processing device.

8. The filter installation according to claim 1, wherein the filter installation further comprises a controller configured to determine whether the auxiliary filter material provided to the filter device for cleaning the raw gas flow is fresh auxiliary filter material or a mixture of paint overspray and auxiliary filter material.

9. The filter installation according to claim 1, wherein the filter installation further comprises a mixing device adapted to combine and mix fresh auxiliary filter material and the mixture of paint overspray and auxiliary filter material.

10. A method for operating a filter installation, comprising:
    feeding a raw gas flow loaded with paint overspray to a filter device of a filter installation;
    introducing auxiliary filter material into the raw gas flow to form a mixture of paint overspray and auxiliary filter material;
    separating the mixture of paint overspray and auxiliary filter material and receiving the mixture in a receiving container; and
    thermally treating at least a part of the mixture of paint overspray and auxiliary filter material using a processing device.

11. The method according to claim 10, further comprising thermally treating a part of the mixture of paint overspray and auxiliary filter material using a processing device within the receiving container or thermally treating a part of the mixture of paint overspray and auxiliary filter material using a processing device that is external to the filter device, and introducing the thermally treated mixture of paint overspray and auxiliary filter material into the raw gas flow as auxiliary filter material.

12. The method according to claim 10, further comprising removing at least a part of the mixture of paint overspray and auxiliary filter material from the receiving container and thermally treating the mixture of paint overspray and auxiliary filter material with a processing device that is external to the filter device.

13. The method according to claim 10, wherein the thermally treating step comprises at least one of drying, burning, combusting, cooling, and pyrolyzing the mixture of paint overspray and auxiliary filter material.

14. The method according to claim 10, further comprising loading the mixture of paint overspray and auxiliary filter material with compressed air.

15. The method according to claim 10, further comprising feeding at least one drying agent or at least one anti-caking agent to the mixture of paint overspray and auxiliary filter material.

16. The method according to claim 10, further comprising at least one of grinding the mixture of paint overspray and auxiliary filter material and pneumatically treating the mixture of paint overspray and auxiliary filter material.

17. The filter installation according to claim 1, wherein the conveyer uses air as a transporting medium.

* * * * *